UNITED STATES PATENT OFFICE.

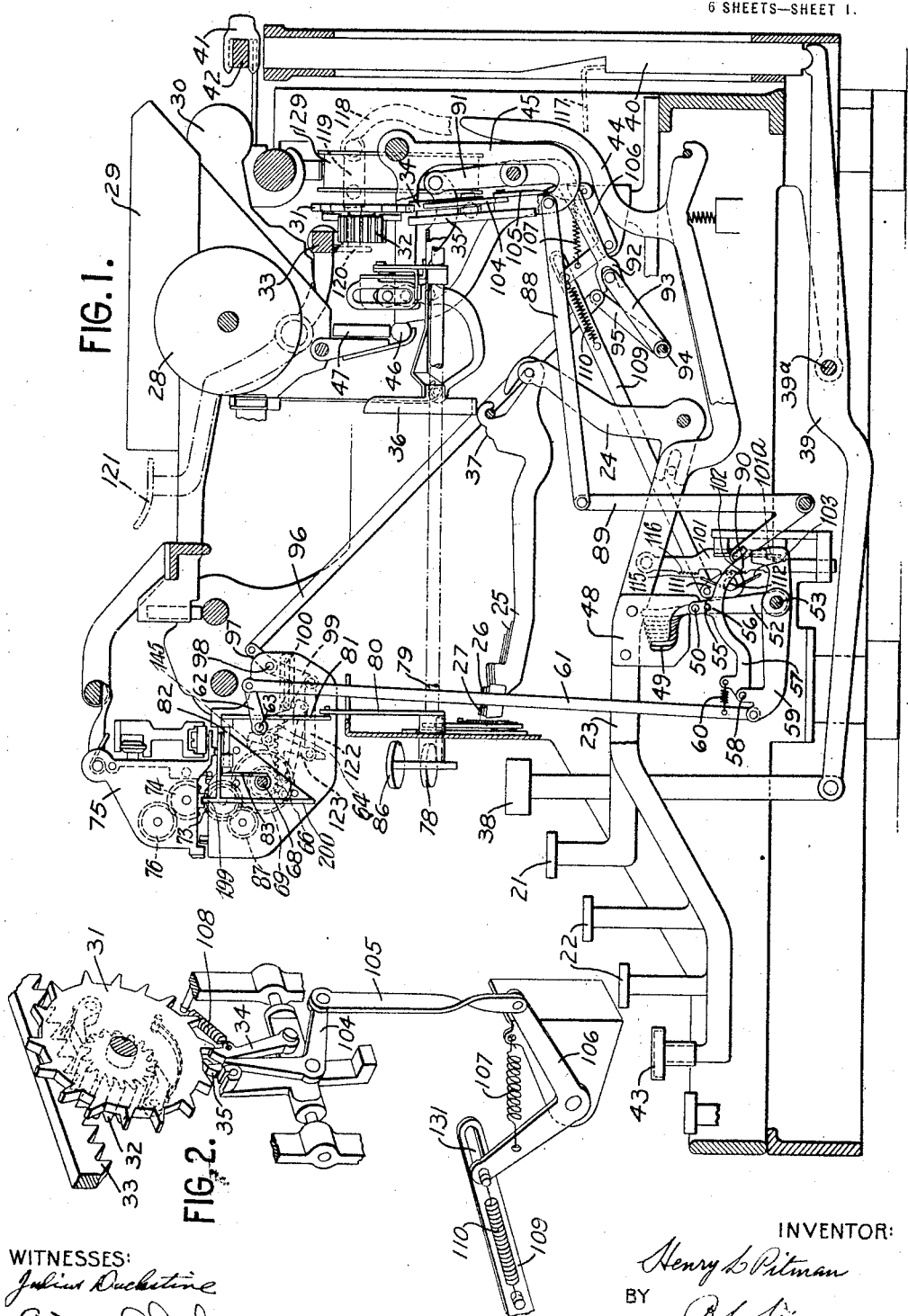

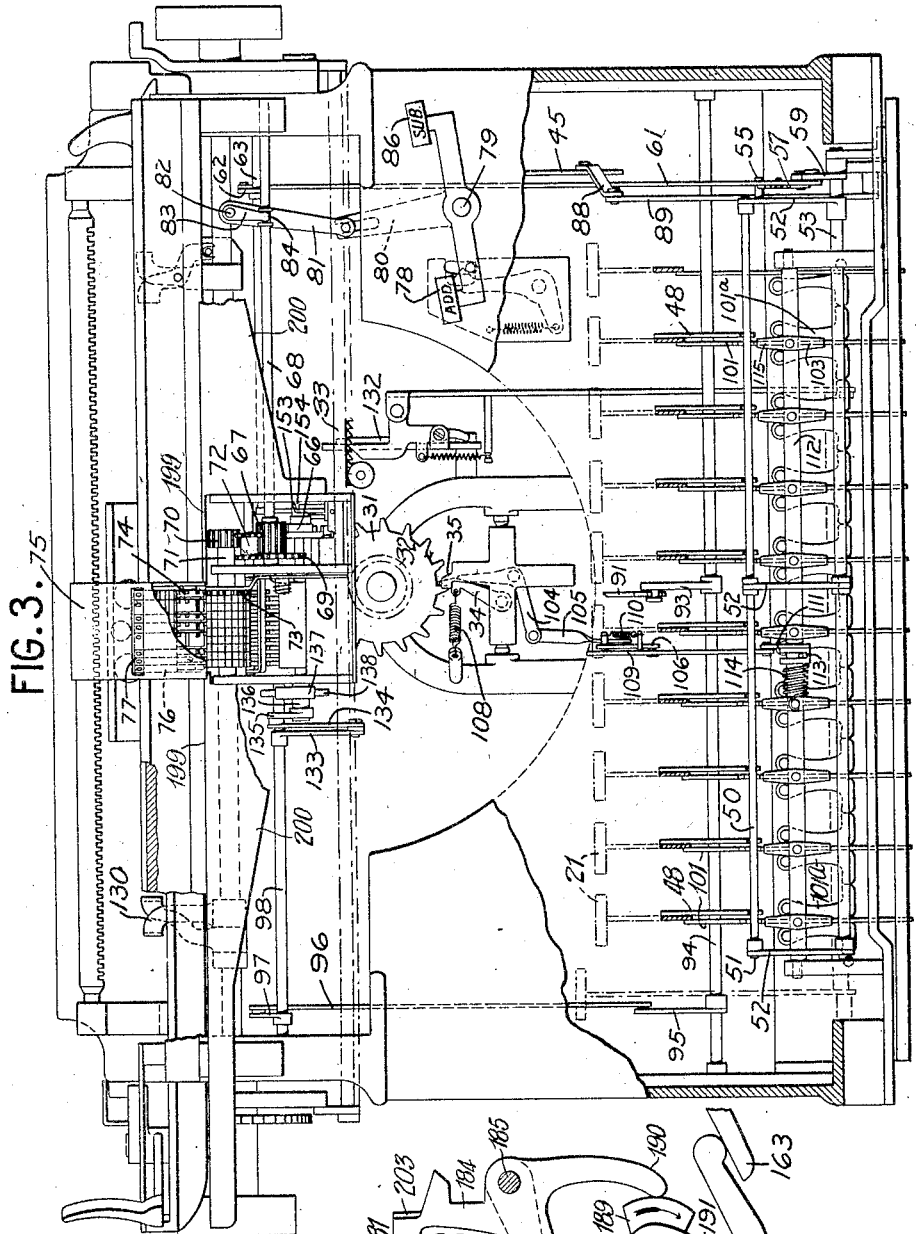

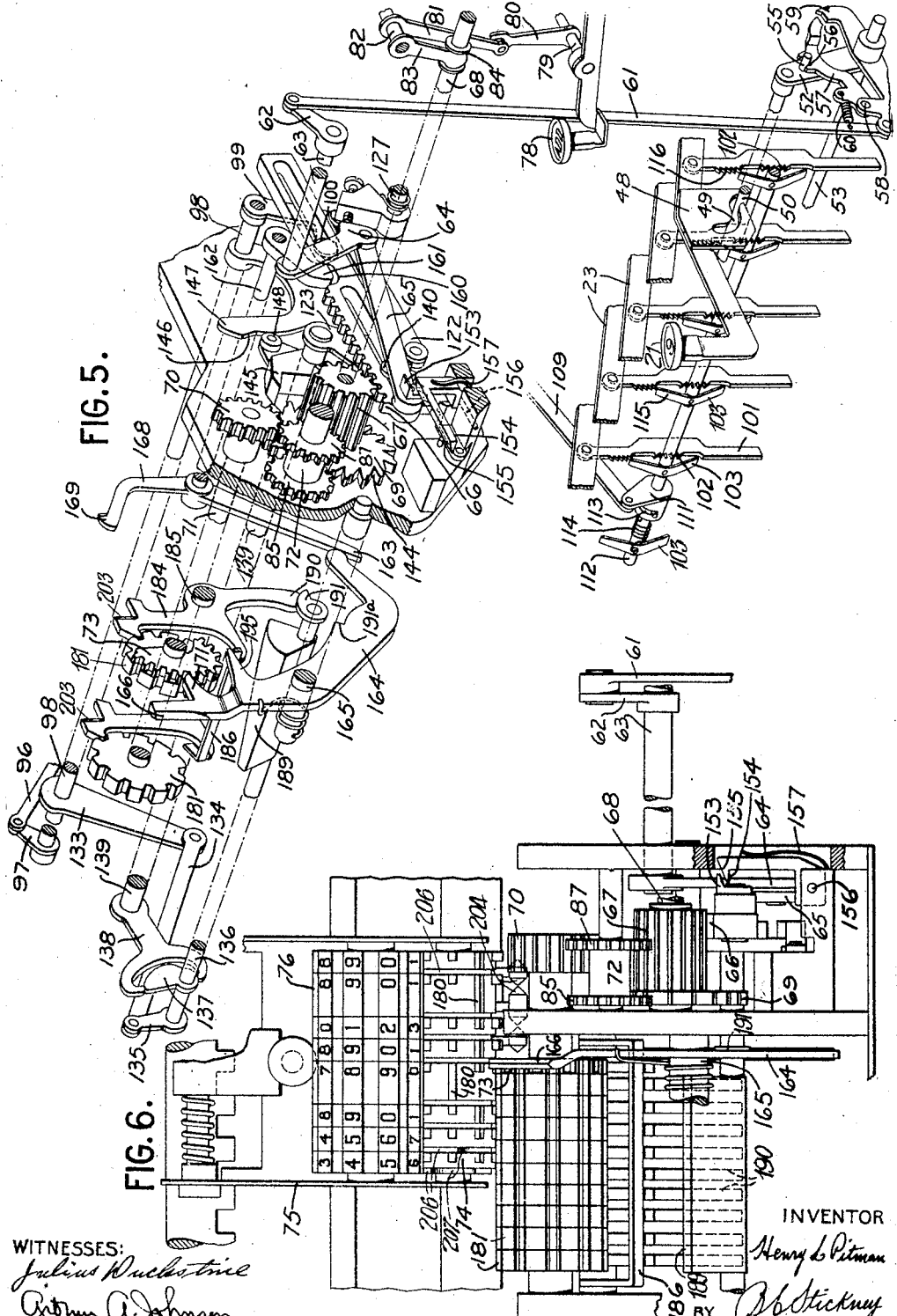
H. L. PITMAN.
COMBINED TYPEWRITING AND COMPUTING MACHINE.
APPLICATION FILED MAR. 2, 1916.
1,345,102. Patented June 29, 1920.
6 SHEETS—SHEET 3.

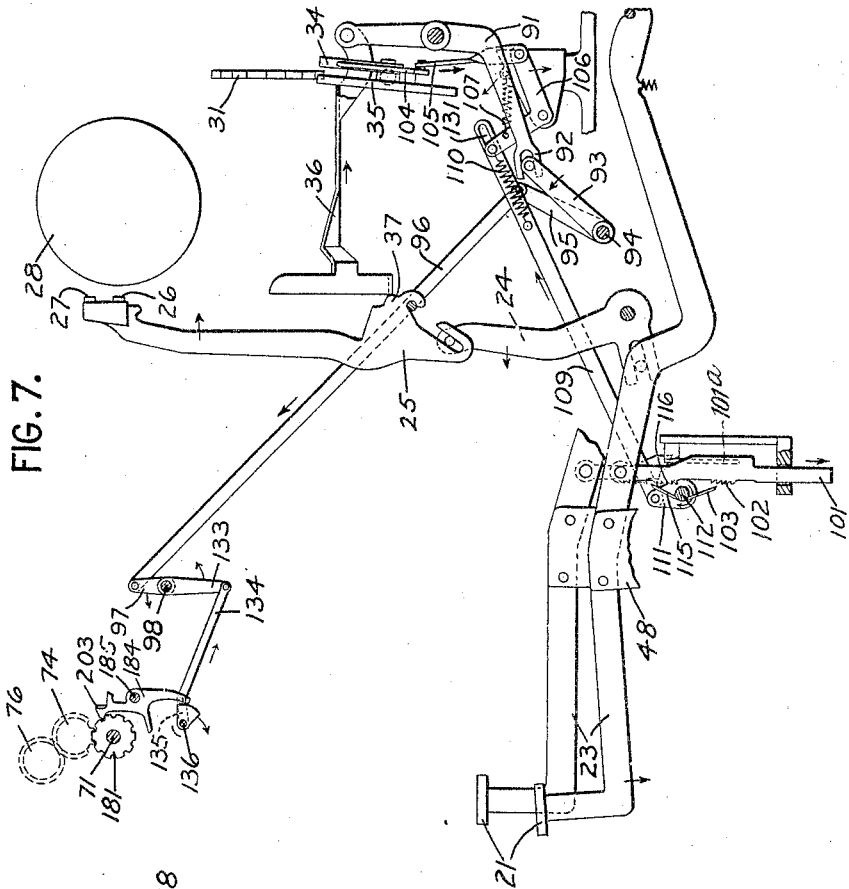
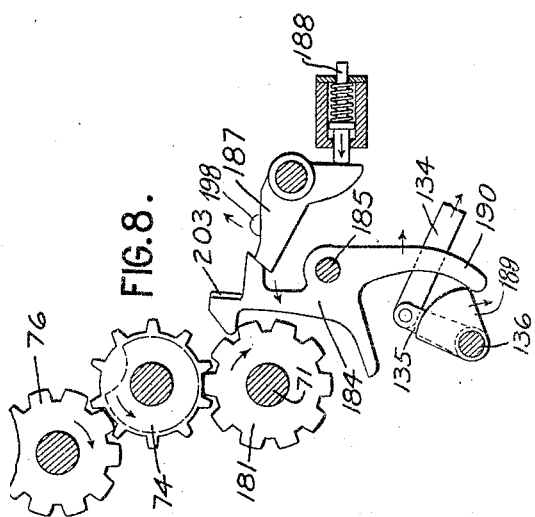
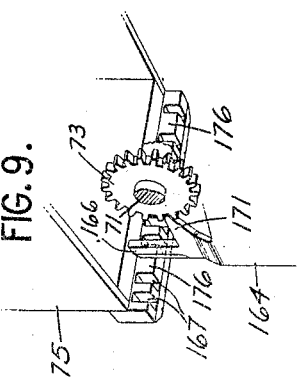

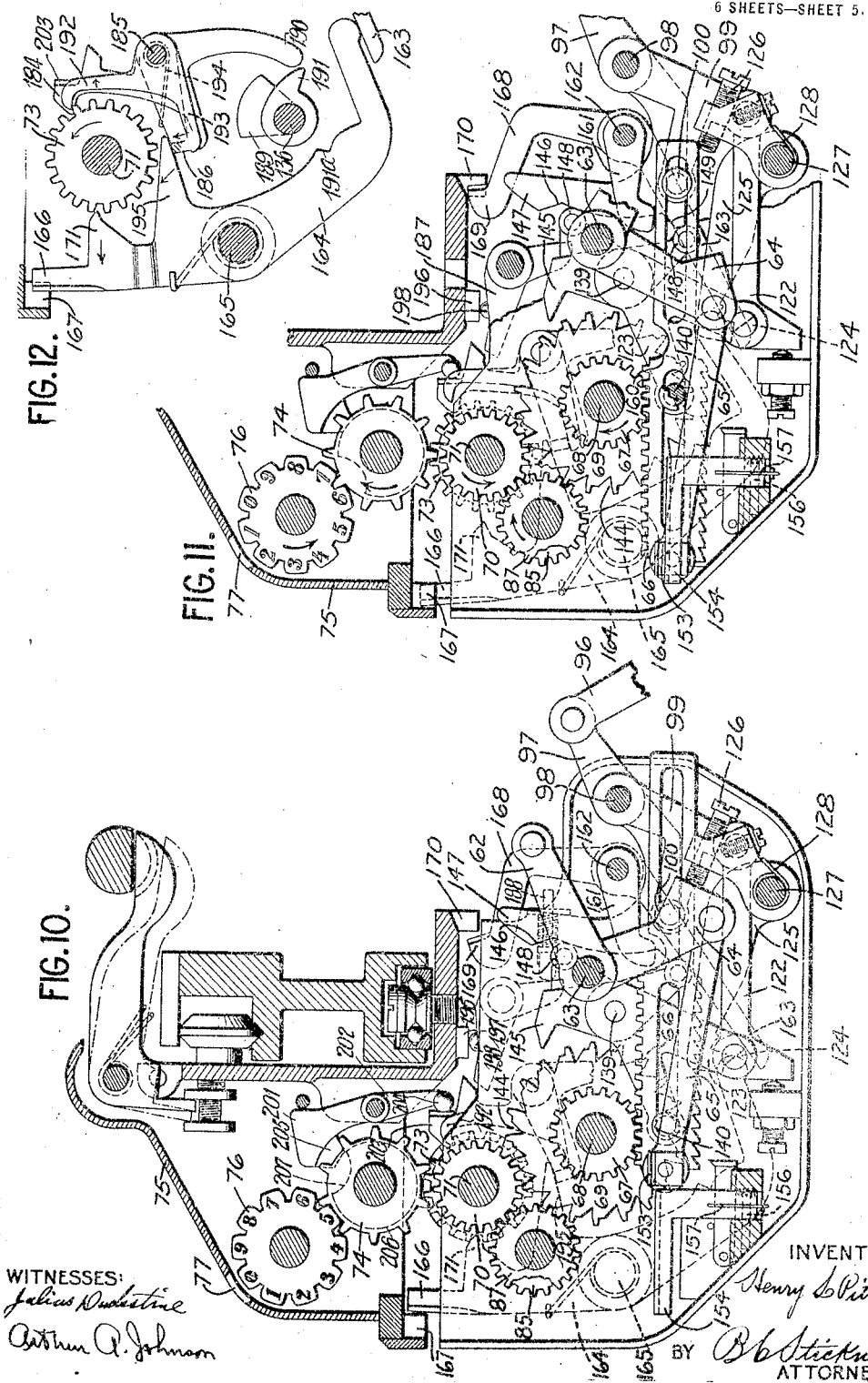

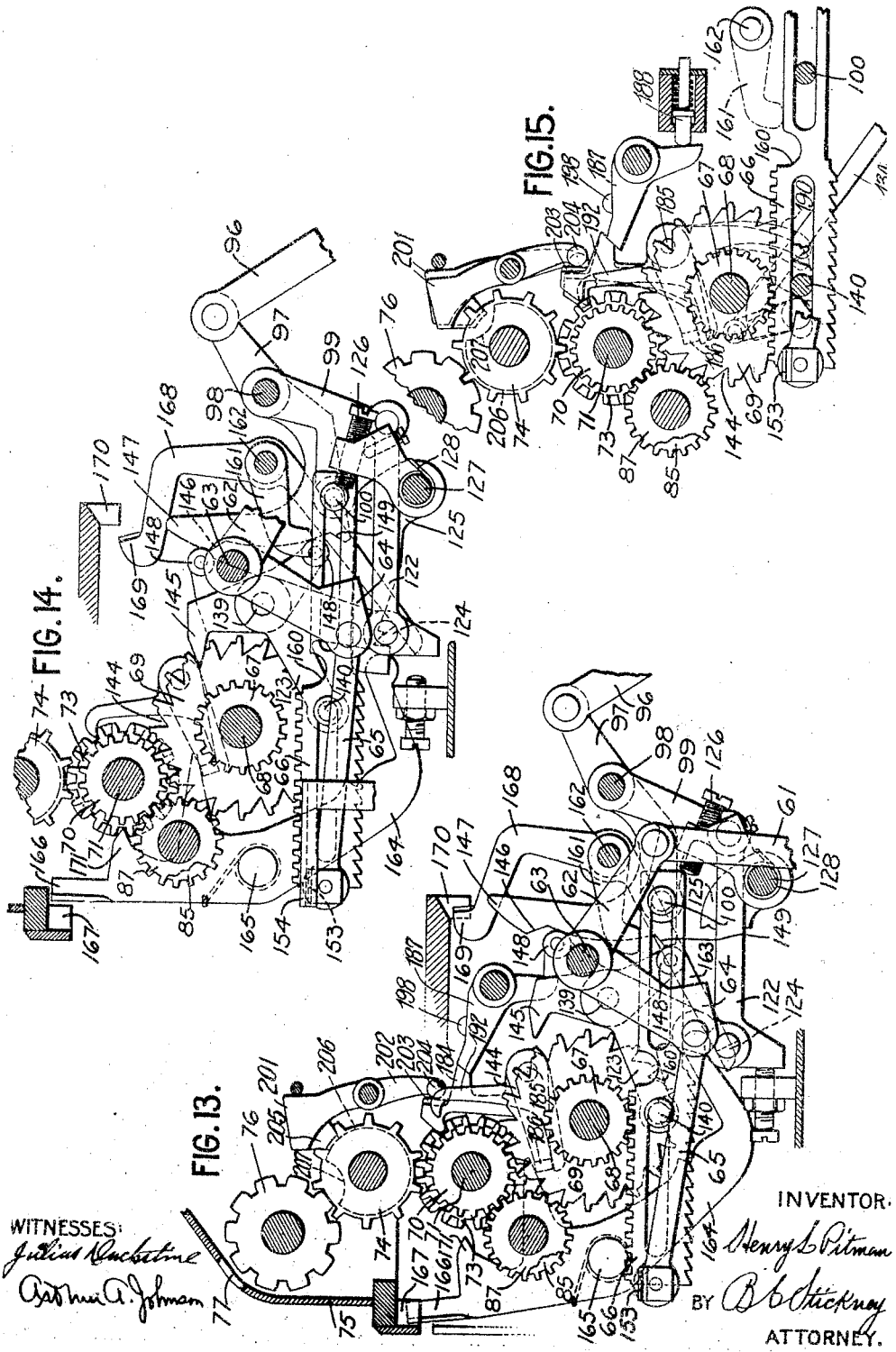

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,345,102. Specification of Letters Patent. Patented June 29, 1920.

Application filed March 2. 1916. Serial No. 81,574.

*To all whom it may concern:*

Be it known that I, HENRY L. PITMAN, a citizen of the United States, residing in East Orange, in the county of Essex and State of New Jersey, have invented certain new and useful Improvements in Combined Typewriting and Computing Machines, of which the following is a specification.

My invention relates to computing machines, and is herein disclosed as applied to a combined typewriting and computing machine, in which the numeral keys of the typewriter control the computing devices, and is more especially illustrated as an improvement on my co-pending applications, Serial No. 24,390, filed April 28, 1915 (now Patent No. 1,308,506, dated July 1, 1919), and Serial No. 29,039, filed May 19, 1915, renewed February 3, 1919, Serial No. 274,634, and on the application of Frederick A. Hart, Serial No. 70,898, filed January 8, 1916 (now Patent No. 1,285,150, of November 19, 1918). In said machines, the numeral keys of the typewriter are connectible to actuate a master wheel, the actuation being effected by a reciprocating rack, which is adapted to drive said master wheel on one stroke, but is out of mesh with the connections to said master wheel on its return stroke.

In the embodiment of the invention herein disclosed, provision is made of cam means for raising and lowering the reciprocating rack, and the power is applied to the forward bell-crank and transmitted therefrom to the rearward bell-crank by means of a link.

In order to hold the master-wheel-actuating gear against movement when the reciprocating rack is depressed, provision is made of a detent for engagement with the shiftable pinion of the master-wheel-reversing gear, and loosely mounted on the shaft of the forward bell-crank, and a controlling cam for the detent mounted on the shaft on which the rearward bell-crank is loosely mounted.

Provision is also made of a full-stroke device for preventing return of an actuated numeral key previous to its complete actuation and also means for preventing a subsequent actuation of said key or of any other numeral key until the depressed key has returned to its normal position. Control of this mechanism is effected by means of the loose dog of the escapement mechanism.

Due to the control of the key actuation by means of the loose dog of the escapement mechanism, the key-controlling mechanism may be effective to prevent actuation of a numeral key during the free movement of the typewriter carriage, such as that obtained by actuation of the tabulator key or carriage-release key and also upon actuation of the usual back-spacing key.

Upon actuation of a numeral key, when the typewriter carriage has reached the limit of its travel in letter-feed direction, as determined by a suitable stop, the loose dog of the escapement mechanism will be released and the key-controlling mechanism will become effective to prevent actuation of a numeral key. In this way locking of the numeral keys may be obtained at any position of the carriage if the operative places a margin or other stop in proper position.

In order to prevent movement of the totalizer during a computing operation, provision is made of locking devices at the front and rear of the totalizer, the lock at the rear being controlled by the reciprocating rack, and the lever of the forward lock being moved into effective position by the rear lock when the latter is moved to effective position, the connection being such that the rear lock may be released without release of the front lock.

A rearward extension of the forward locking lever overlies the bail universal to the carry-over detents and a master-wheel detent, which is provided in this case. It will be seen that, due to this construction, the forward locking lever will be locked in effective position when any detent is held out of its normal position due to its engagement with the top of a tooth on the corresponding wheel.

For the purpose of completing the movement of the carry-over wheels and thereby obviating the spiral effect due to lost-motion in the carry-over mechanism, provision is made of means, comprising a member, preferably a cam, actuated to engage said carry-over detents successively from that of the lowest order to that of the highest, to aline or justify the same.

Mounted to move with the alining member is an arm which, at the end of the active movement of the alining member, engages a cam surface in the forward locking lever and moves the lever to ineffective position.

In order to prevent printing in punctuation spaces, the rack, carried by the totalizer, with which the forward locking lever coöperates, has no notches corresponding to the punctuation spaces and the resulting broad teeth prevent a forward movement of the locking lever, which, by reason of its connection with the bar universal to the detents, prevents movement of the master-wheel detent, thereby preventing actuation of the numeral keys. The same effect is obtained by the forward locking lever preventing effective movement of the rearward locking lever, which in turn will prevent effective movement of the reciprocating rack. The rack at the rear of the totalizer may also be provided with broad teeth or blocks at punctuation spaces to prevent movement of the rearward locking lever and therefore prevent actuation of the reciprocating rack.

Other features and advantages will hereinafter appear.

In the accompanying drawings,

Figure 1 is a general sectional side elevation, showing the typewriter and its connections to the computing mechanism.

Fig. 2 is a fragmentary view in perspective, looking from the rear, of the typewriter escapement mechanism and its connections to the full-stroke mechanism.

Fig. 3 is a general front elevation of the typewriter and computing mechanism with parts broken away and parts omitted for clearness.

Fig. 4 is a fragmentary detail view showing the master wheel detent mechanism and the carry-over assisting mechanism.

Fig. 5 is a skeleton perspective view showing the connections from the numeral keys and the typewriter escapement mechanism to the computing mechanism, and also showing the state-controlling means.

Fig. 6 is an enlarged detail front view of the totalizer, master wheel, and adjacent mechanism, with parts broken away for clearness.

Fig. 7 is a diagrammatic side view, showing the action of some of the mechanism of my invention when a numeral key is near the end of its down-stroke.

Fig. 8 is an enlarged sectional side view of the carry-over assisting mechanism, and some of its associated parts.

Fig. 9 is a detail fragmentary view in perspective, looking from the bottom up, showing the master wheel and its detent held against actuation when a punctuation space of the totalizer is at the computing point.

Fig. 10 is an enlarged sectional side view of the totalizer and adjacent mechanism in its normal position.

Fig. 11 is an enlarged side view similar to Fig. 10, showing the parts during actuation.

Fig. 12 is a sectional side view showing the disengagement of the detent from its master wheel at the beginning of the master wheel actuation.

Fig. 13 is an enlarged side view similar to Fig. 10, showing the parts at the end of the forward stroke of the master-wheel-actuating rack bar.

Fig. 14 is a side view similar to Fig. 13, showing the position of the parts at the end of the down-stroke of a numeral key.

Fig. 15 is a side view similar to Fig. 11, showing the action of the parts during a carry-over operation.

Numeral keys 21 and alphabet keys 22 depress key-levers 23 to rock bell-cranks 24 to swing type-bars 25 upwardly and rearwardly to cause type 26, 27, thereon to print on the front side of a cylindrical platen 28 journaled on a platen frame 29 which is mounted on the traveling typewriter carriage 30 (Fig. 1). The carriage is constantly under the tension of the usual spring barrel 129, which tends to move the carriage in letter-feeding direction, said motion taking place at each depression of a character key or space key. The carriage is controlled in its step-by-step letter-feeding motion by the usual escapement wheel 31, associated with a pinion 32 meshing with a rack 33 pivoted on the typewriter carriage 30.

To move the typewriter carriage 30 in step-by-step letter-feeding direction, the heel 37 of its associated type bar will move the universal frame 36 rearwardly (Fig. 7) at the end of the down-stroke of a numeral key 21, and swing therewith the dogs 34, 35 (Figs. 1, 2 and 7) so that the loose dog 34 normally holding the escapement wheel 31 will be moved out of engagement with said escapement wheel 31 and the fixed dog 35 into engagement with said escapement wheel, so that at the subsequent forward motion of said universal frame 36, the typewriter carriage will be moved one letter-space in letter-feeding direction under the influence of the usual spring barrel 129 during the up-stroke of the numeral key 21.

Jump movements of the carriage 30 may also be obtained in addition to the step-by-step movements, for the purpose of rapidly positioning the typewriter carriage in and at a computing zone. For this purpose, the machine may be provided with one form of the usual Underwood decimal tabulating mechanism, which includes keys 38 mounted on the front ends of key-levers 39, which are pivoted intermediate their ends at 39ᵃ. The rear end of each lever 39 is connected to raise its plunger 40 into the path of one of a plurality of stops 41 mounted on a rack bar 42, said stops being adjustable at letter-space intervals along the rack-bar which forms part of the typewriter carriage 30. At the raising of any of the plungers 40, the rack bar 33 is disconnected from its pinion 32 by the usual carriage-release mechanism, indicated in Fig. 1 by dotted lines, thus releasing the carriage 30 from the letter-feed escapement mechanism, so that the carriage is rapidly drawn in letter-feed direction until arrested by one of the stops 41 thereon striking against the raised plunger or counter-stop 40.

The type-bars 25 for the keys 21 and 22 are each provided with two types 26 and 27, so that they control selectively the writing of two different characters. On the numeral type-bars the digit type 26 is usually placed to print in lower-case position, while other characters are printed by the upper-case type 27. To effect the change from normally writing lower-case characters to writing upper-case characters, the platen 28 is mounted to be shifted from a lower-case position to an upper-case position. For this purpose, there is provided the usual shift key 43 on a lever 44, the rear end of which engages a shift frame 45, pivoted on the framework of the typewriter, and provided with a horizontal rail 46 on which rests a roller 47 mounted on the platen frame 29. On depression of said shift key, the rail 46 is caused to move upwardly, thus raising the platen frame 29 to bring the printing line of the platen 28 opposite the upper-case type 27 on the type-bars 25 when the latter are swung to their printing position.

The above-described mechanism is that found in the usual Underwood standard typewriting machine.

The mechanism for determining the extents of computing actions so that they will accord with the digital values of the numeral keys as actuated, comprises parts connected to the numeral keys. These parts include differential cams 48 (Figs. 1 and 3), one on each of the numeral key levers 23 from "1" to "9." The cams 48 are each shown in the form of a plate fast to the key lever, and having a cam slot 49 open at its lower end. The lower open ends of the cam slots register with a rod or bar 50 (Figs. 1 and 3), universal to all of the cams 48, said rod 50 forming the cross piece of a bail having arms 52 fast on a rock shaft 53. The bail 51 forms part of the actuating mechanism, and inasmuch as it is oscillated varying amounts, depending on the digital value of the key operated, it may be termed an oscillator. Said oscillator 51 is adapted to rotate a master wheel described below, and for this purpose (Figs. 1 and 5) is provided with a pin 55 on one of its arms 52, said pin being adapted to engage a notch 56 formed in a connector 57 pivoted at 58 on a lever 59 journaled on the rock shaft 53, said connector 57 being drawn into engagement with the pin 55 by a spring 60.

At the depression of a numeral key 21, the oscillator 51 and lever 59 will be rocked an extent directly proportional to the value of said numeral key, to move downwardly therewith and upwardly extending link 61 (Figs. 1 and 3), pivoted at its lower end to the lever 59 and pivoted at its upper end to the rear end of an arm 62 fast on a rock shaft 63 (Fig. 5), to swing said rock shaft clockwise (Fig. 1) and therewith a depending arm 64 fast thereon, and having pivoted thereto at its lower end a forwardly extending link 65, the forward end of which is pivoted to the forward end of a differentially moved rack bar 66 (Figs. 1, 5, 10, 11, 13 and 15), to move said rack bar longitudinally forwardly extents directly proportional to the value of the numeral key depressed. To effect computations, said rack bar 66 is normally in mesh with a barrel gear 67 mounted on a shaft 68, and has rigidly and concentrically mounted therewith a combined gear and detent wheel 69 adapted to rotate a gear wheel 70 fast on the master wheel shaft 71, either directly or through the intermediary of a change gear 72 (Fig. 5), thereby rotating a master wheel 73 also fast on the shaft 71, extents directly proportional to the value of the numeral key depressed. Said master wheel is adapted to mesh *seriatim* with computing wheels 74 of one or more totalizers 75, starting with the computing wheel of highest denomination, and passing into mesh with the computing wheels of lower denomination, as the totalizer 75 and typewriter carriage 30 move step by step in letter-feeding direction. Each computing wheel 74 is constantly in mesh with its dial wheel 76 (Figs. 6 and 10,) the latter having the numerals from "0" to "9" on the periphery thereof, one numeral of each dial wheel normally appearing at the sight opening 77 in the casing of the totalizer 75 (Figs. 3 and 10).

For the purpose of performing addition, the gear 69 is shifted to effective position in mesh with the gear 85, and to do this the machine is provided with an adding key 78 (Figs. 1, 3 and 5), mounted on a rock shaft 79 having fast thereon an upright arm 80, which by means of a fork formed at the upper end engages the lower end of an arm 81 fast on a rock shaft 82, the forward end of which has an arm 83 engaging an annular groove 84 formed in the shaft 68 on which are mounted the gears 67, 69, to move said gears to the Figs. 3 and 5 position at the depression of the adding key 78. It will be noted by reference to Figs. 3 and 5 that at the depression of the adding key 78, the gear wheel 69 is moved into mesh with the left-hand gear wheel 85 of the change gear 72, so that depression of a numeral key will rotate the dial wheels in adding or clockwise direction, as seen in Figs. 10 and 15.

When it is desired to subtract, the gear wheel 69 is moved out of mesh with the gear wheel 85 and into mesh with the gear wheel 70 by the depression of a subtraction key 86 (Figs. 1 and 3) also mounted on the rock shaft 79. In this position depression of a numeral key will rotate the dial wheels 76 in counter-clockwise or subtraction direction, as seen in Fig. 11, the left-hand gear-wheel 85 and right-hand gear-wheel 87 of the change gear 72 rotating idly during the actuation of the computing mechanism in subtraction direction.

The numeral keys 21 have lower and upper-case type 26 and 27 respectively, the latter to print characters other than numerals on the work-sheet carried by the platen 28. When the numeral keys 21 are actuated to print characters other than numerals, as in upper-case position, it is advantageous to disconnect the oscillator 51 so as to leave the rack bar 66 idle. For this purpose, the shift frame 45 at the depression of a shift key 43 disconnects the connector. To do this it thrusts forwardly a link 88 pivoted to the shift frame, the forward end of which link is pivoted to an arm of a bell-crank 89 (Fig. 1) to rock said bell-crank in counter-clockwise direction, so that a pin 90 thereon, which normally overlies the rear end of the connector 57, will depress said connector moving its notch 56 out of engagement with the pin 55 formed on the oscillator 51. Said oscillator will then be rocked idly by the cams 48 at the actuation of the numeral keys 21.

As hereinbefore described, the rack bar is normally in mesh with the barrel gear 67, so as to rotate said barrel gear and associated gearing at the depression of a numeral key when the latter is actuated in lower-case position to perform a computation. In order to prevent said barrel gear and connected gearing from returning at the return stroke of the rack bar 66, the rack bar is depressed out of mesh with said barrel gear, and held in said depressed position until the end of the return stroke of said rack bar. For this purpose, the universal frame 36 is pivoted at its rear end (Figs. 1 and 7) to a rocking frame 91, one arm of which has a fork 92 formed at its end to engage and rock an arm 93 at the end of the down-stroke of a numeral key. This arm is adapted to move the rack bar 66 downwardly, and to do this said arm is fast to a rock shaft 94, which carries an arm 95, to which is pivoted an upwardy-extending link 96 (Figs. 1, 3 and 5), the upper end of which is pivoted to an arm 97 fast on and adapted to rock a shaft 98, on which is loosely mounted a bell-crank 99 (Figs. 1, 5 and 14) having a pin-and-slot connection 100 with the rack bar 66, and forming part of the means to move the rear end of said rack bar upwardly and downwardly. Simultaneously the forward end of said rack bar will also be moved downwardly or depressed, as will hereinafter be described, so that the gear teeth thereon will be moved out of mesh with the associated barrel gear 67, so that the rack bar 66 may be moved rearwardly without imparting rotation to said barrel gear. The numeral keys are provided with pendants 101 which coöperate with swinging dogs 101$^a$ to prevent simultaneous depression of two numeral keys.

The mechanism thus far described is in general the same as that described and illustrated in my said Patent No. 1,308,506 dated July 1, 1919.

It is advantageous that the numeral keys 21 should be actuated to the extreme end of their downward stroke in a computation, so that the master wheel will be rotated a full extent proportional to the value of the actuated numeral key, and to insure that the type on the type-bar 25 will print on the work-sheet carried by the platen. For this purpose, each numeral key lever has pivoted thereto a pendant 101 (Figs. 1, 3, 5 and 7) having teeth 102 formed thereon which normally stand in engaging relation with a pawl 103 in the form of a leaf spring, one for each numeral key, and adapted to step over the teeth 102 on the down-stroke of said numeral key, said teeth being so formed as to pass said spring pawl 103 at the downward stroke of the pendant 101 and its numeral key, but to engage and arrest the spring pawl 103 at the up-stroke of said pendant. The connections are such that said teeth will catch upon the end of the pawl 103 to prevent the up-stroke of the pendant and connected numeral key unless the pawl 103 is moved out of engaging relation with the teeth 102 at the extreme end of the downward stroke of any numeral key, as will presently appear.

It is advantageous to prevent the down-stroke of any numeral key until the one actuated has reached the extreme end of its upward motion, so that the rack bar 66 will be moved fully to its rearward normal position, so as to be in position to perform a following computation. As part of the mechanism for accomplishing this purpose, as well as for insuring a full stroke of the keys, there is pivoted on the typewriter-carriage-escapement fixed dog 35 a bell-crank 104. The upwardly-extending arm of this bell-crank lies directly behind the loose dog 34 (Figs. 2 and 3), and the other arm has pivoted thereto a downwardly-extending link 105, the lower end of which is pivoted to one arm of a bell-crank 106 pivoted to the framework of the machine. At the end of the depression of a key the bell crank 106 is adapted to be swung in clockwise direction, as seen in Figs. 1, 2 and 7, because a spring 107 so swings it to follow the loose dog 34 when the dog is drawn to the right at Fig. 2 under tension of the spring 108 when released from engagement with the escapement wheel 31, because the dog is carried rearwardly by operation of the universal member 36 at that time. This swings said dog leftward when released from the escapement wheel, as seen in Fig. 3, with the result that the bell-crank 104, link 105, and bell-crank 106, are swung from their normal position, as seen in Figs. 2 and 3, by the power of their spring 107, to the Fig. 7 position. This carries the spring pawls 103 clear of the teeth 102 on the depressed key, because a spring 110 draws rearwardly a link 109 of which the forward end is pivoted to an arm 111 (Figs. 1, 5 and 7), loosely mounted on the shaft 112, on which the spring pawls 103 are fast, and has a pin-and-slot connection 113 therewith (Fig. 5), so as to rock said shaft in clockwise direction from the Fig. 1 to the Fig. 7 position at the end of the down-stroke of a numeral key. This moves spring pawls 115 also fast on the shaft 112 and oppositely disposed to the spring pawls 103, into engagement with teeth 116 formed on the pendants 101 above the teeth 102 and oppositely disposed thereto, so that said teeth 116 will move idly over the ends of the spring pawl 115 as the depressed numeral key rises. The teeth 116, however, will come into engagement with said pawls at an attempted down-stroke of said depressed numeral key, or in fact of any numeral key, thus preventing any down-stroke during the time that the pawls 115 are held in the Fig. 7 position, in which they remain until the numeral key has reached the end of its up-stroke, as will hereinafter appear.

In order to provide the spring pawls 103 with supplementary flexibility and that the shaft 112 may oscillate as the teeth 102 pass over the ends of their respective spring pawls, there is provided a coil spring 114, one end of which is attached to the arm 111 and the other end of which is attached to the shaft 112, and is tensioned in such a manner that the shaft 112 will be rocked in clockwise direction (Fig. 5) through the intermediary of the pin-and-slot connection 113, and in counter-clockwise direction through the intermediary of said spring 114 which spring will allow the shaft 112 to rock relative to the arm 111 at the down stroke of a numeral key, at which time the teeth 102 pass freely over the end of the pawl 103.

In order that the teeth 116 may pass freely over their respective pawls 115 and to permit the rock shaft 112 to oscillate during the up-stroke of a numeral key, there is provided in combination with the spring 110 a pin-and-slot connection 113 which permits the link 109 (Fig. 7) to reciprocate against the tension of the spring 110, through the intermediary of the pin-and-slot connection 113, as the teeth 116 pass over the pawl 115 during the up-stroke of the numeral key while the bell-crank 106 remains stationary in its actuated position, being held by the spring 107.

It is advantageous to prevent the actuation of any numeral key 21 and totalizer mechanism during a tabulating movement of the typewriter carriage 30, so that no computation may take place while the totalizer 75 is moving relatively to the master wheel. For this purpose, at the actuation of any decimal tabulator key 38, the pawls 115 are moved into engagement with the teeth 116 formed on the pendants 101 of the numeral key levers to prevent the depression thereof at which time the actuated plunger 40 will actuate a universal bail 117 (Fig. 1), which, through the intermediary of a link 118, lever 119, and roller 120, common to Underwood decimal tabulating mechanism, will raise the typewriter carriage rack bar 33 out of engagement with the pinion 32, so that the carriage may be free to move under the influence of its spring barrel 129. This takes the tension of the carriage spring off the pinion 32 and so permits the pinion 32 and associated escapement wheel 31 to move in clockwise direction, as seen in Fig. 3, under the influence of the spring 108 of the dog 34 with which said escapement wheel is in engagement during a decimal tabulating action. The bell-crank 104 is then free to rock in counter-clockwise direction, as seen in Fig. 3, under the influence of its spring 107, so as to move the link 109 rearwardly, and the spring pawls 115 into engaging relation with the teeth 116 of the pendants 101 to prevent the depression of any numeral key 21 until the actuated decimal tabulator key 38 is released. When said decimal tabulator key 38 is released and has reached its normal position, the typewriter carriage rack bar 33 engages the escapement pinion 32, which is then swung in counter-clockwise direction, as seen in Fig. 3, and therewith the escapement wheel 31 swings the dog 34 rightwardly, and therewith the bell-crank 104, to restore said bell-crank and connected parts to their normal position, thus moving the spring pawl 115 to its normal ineffective position, so that a numeral key 21 may be actuated and computation may take place.

It is advantageous to prevent the depression of any numeral key or the actuation of the dial wheels of the totalizer 75 during the manual lateral shifting of the typewriter carriage 30 in either direction when the release key lever 121 (Fig. 1) is depressed to swing the typewriter carriage rack bar 33 out of engagement with the escapement pinion 32, thus freeing the pinion and connected escapement wheel 31 from the influence of the typewriter spring barrel 129. This locking of the keys is brought about in the same manner as when said rack bar 33 is moved out of engagement with its pinion 32 at the depression of a decimal tabulator key 28, to swing the spring pawls 115 into effective position in the aforesaid manner to prevent the depression of any numeral key and concomitant computation because the freeing of the escapement wheel from the spring barrel permits the loose dog to become effective on the spring pawls 115.

It may be noted, in passing, that the herein described full-stroke mechanism will always be effective during the down-stroke of the numeral keys 21 and will always be effective during the up-stroke of said numeral keys regardless of whether said keys are actuated to compute or not to compute, or, to print numerals or characters, and is also effective whenever the rack bar 33 is moved out of engagement with its pinion 32, as hereinbefore described, or through any other cause, for example, at the actuation of the Underwood standard back-spacing mechanism 132 (Fig. 3), explained in patent to Helmond, Serial No. 930,962, or at any time that the rack 33 of said typewriter carriage 30, in mesh with the pinion 32, is not tensioned in letter-feeding direction by its spring barrel 129 or other means, because then said escapement wheel 31 may be swung in clockwise direction as seen in Fig. 3, by the spring 108.

It is advantageous to prevent the actuation of any numeral key 21 and the totalizer mechanism when the typewriter carriage has reached the end of its travel in letter-feeding direction, at which time said carriage comes into engagement with the usual Underwood marginal stop 130 provided at the left side of the Underwood typewriter. When the typewriter carriage reaches said left-hand marginal stop, in which position a character may be printed on the work-sheet carried by the platen, the depression of the typewriter key to perform said printing actuates the escapement mechanism of the typewriter carriage so that the dog 34 (Fig. 3) is swung leftwardly, holding the spring pawls 115 to effective position in the aforesaid manner during the up-stroke of any key which has been depressed when said carriage has reached said left-hand marginal stop, so as to prevent the actuation of any numeral key. Since the carriage is prevented from moving farther in letter-feeding direction by said left-hand marginal stop, the escapement wheel 31 is not to be rotated in counter-clockwise direction (Fig. 3), thus leaving the dog 34 in actuated leftward position. This leaves the spring pawls 115, therefore, in effective position so as to prevent the actuation of any numeral key when the typewriter carriage 30 stands at the extreme end of its leftward travel.

It will be seen from the foregoing, and from the accompanying drawings of this application, that the numeral keys 21 will be held against actuation by the spring pawls 115 during the up-stroke of any character key 22, since the character keys, as well as the numeral keys, actuate the typewriter escapement dogs 34, 35.

It will also be noted from the foregoing and the accompanying drawings, that the herein-described full-stroke mechanism for the typewriter keys 21 is effective when said keys are used to print with the platen in upper-case position, as well as when printing in lower-case position.

It will be noted by reference to Figs. 1 and 7 that the heels 37 formed on the typebars 25 are only effective on the universal frame 36 during the last part of the down-stroke of the typewriter keys 21, 22, and only during the early part of the up-stroke of said keys. In order that the spring pawls 115 may be held in effective position during the entire up-stroke of any numeral key 21, it is advantageous to hold the dogs 34, 35 of the typewriter escapement mechanism in actuated position until the depressed numeral key 21 has reached the end of its upward stroke, viz., its normal position.

The bell-crank 99 is connected by a forwardly-extending link 122 with the forward bell-crank 123, which also forms part of the guiding means for rack bar 66. It will be seen that the connection between the bell-cranks 99 and 123 will cause them to be moved simultaneously. In order to actuate said bell-cranks, an arm 133 is fixed on shaft 98, and this arm is connected by means of a forwardly-extending link 134 to an arm 135 fixed on shaft 136, which carries a cam 137. This cam engages the fork of an arm 138 on rock shaft 139, on which bell-crank 123 is fixed. Said bell-crank 123 has a pin-and-slot connection with the forward end of the rack bar 66. Upon movement of universal frame 36, cam 137 will be rocked to effect a raising or lowering of rack bar 66 in accordance with the direction of movement of said universal frame. It will be seen that, upon movement of universal frame 36 to the rear, cam 137 will be swung so as to move bell-crank 123, and, consequently, bell-crank 99, through link 122, and cause rack bar 66 to be depressed. Upon return movement of the universal frame, cam 137 will act upon arm 138 to restore the rack bar to its normal position. It will be understood that, when in the position shown in Fig. 5, cam 137 will serve to lock the rack bar in raised position.

In order to maintain the rack bar 66 out of engagement with pinion 67 during the return stroke, provision is made of a pin 124 at the forward end of link 122, which, when said link is in the Fig. 14 position, will be engaged by spring-pressed latch 125, and the bell-cranks thereby prevented from returning to their normal positions. At the end of the return movement of the rack bar, the lower end of arm 64 will strike an adjustable screw on latch 125, and swing said latch about its pivot 127 against the tension of its spring 128, and release the bell-cranks, thereby permitting the universal frame of the escapement to be returned to its normal position, thus effecting an upward movement of rack bar 66 by means of cam 137. Another means to maintain said rack bar in depressed position during its return stroke will be described hereinafter. By thus maintaining the rack bar depressed during its rearward movement, the dogs 34 and 35 of the typewriter escapement mechanism will be held in actuated position until the end of the upstroke of the numeral key actuated. Consequently, the spring-pawls 115 will be held in effective position during the entire upstroke of the numeral key.

In order to prevent over-rotation or over-throw of the gear wheel 69 and connected parts, including the master wheel 73, (Figs. 5, 10, 11, 13 and 14), the gear 69 has notches 144 cut therein which are adapted to be engaged by a detent pawl 145 loosely mounted on the shaft 139 and of sufficient width to engage the wheel 69, in either adding or subtracting position. The pawl 145 is normally out of engagement with the wheel 69, as seen in Figs. 5 and 13, and has rollers 148 mounted at the rear thereof, the upper one of which is adapted to be engaged by a cam 146 formed on a cam arm 147 fast on the rock shaft 98, so that at the actuation of said rock shaft at the end of the forward stroke of the rack bar 66, the cam 146 will be swung in counter-clockwise direction, as seen in Fig. 13, from the Fig. 13 position to the Fig. 14 position, to engage the roller 148 and swing the detent pawl 145 in counter-clockwise direction, so that the point thereof will come into engagement with one of the notches 144 of the detent gear-wheel 69 just a short time in advance of the depression of the forward end of said rack bar, thus preventing overthrow at the end of the forward stroke of said rack bar, or accidental displacement of the gear-wheel 69 and connected parts during the return stroke of said rack bar 66. At the end of the return stroke of the rack bar 66, the cam arm 147 will be returned to its normal position, carrying its cam 146 out of engagement with the upper roller 148, at which time a cam 149 also formed on the cam arm 147 will come into engagement with the lower roller 148, to swing the detent pawl 145 in clockwise direction from the Fig. 14 position to the Fig. 13 position, out of engagement with the gear-wheel 69. At this time the rack bar 66 will be moved to normal position into engagement with the barrel gear 67, as will presently appear, ready for a following computation. The cams 146 and 149 are so formed with respect to the position of the rollers 148 that the pawl detent 145 will be positively moved into and out of engagement with the gear-wheel 69, and will be positively held against displacement in either direction; in other words, will only be moved at the actuation of the cam arm 147.

It is advantageous to prevent the meshing of the rack bar 66 until the very end of its return to normal position so as to avoid clashing of the gear teeth of said rack bar and barrel gear 67. For this purpose, in addition to latch 125, provision is made at the forward end of the rack bar 66 of a tappet in the form of a projection 153 (Figs. 3, 5, 6, 10, 11, 13, 14 and 15), which is normally in the rear of and out of engagement with a track 154 pivoted to the framework and lies above said track when the rack bar 66 is in normal position in mesh with the gear 67. During the forward stroke of the rack bar 66, the tappet 153 moves forwardly therewith over the track 154 until at the end of the forward stroke of the rack bar, when the depression of the forward end of the rack bar carries the tappet 153 thereon down into engagement with a cam surface 155 formed on the upper face of the track 154, thus swinging said track in clockwise direction, as seen in Fig. 6, thereby pushing said track aside by rotating it about its pivot 156 against the tension of its spring 157. As soon as the tappet 153 gets beneath said track, the spring returns said track to its normal position, so that the tappet 153 underlies the track 154, as seen in Fig. 14. During the ensuing rearward motion of the rack bar 66 back to normal position, the tappet 153 moves rearwardly therewith under the track 154, until said tappet just moves out of engagement with said track at the very end of the rearward motion of the rack bar 66, at which time the track 154 allows the forward end of the rack bar 66 to move upwardly to its normal position, so that the teeth thereof will mesh with the teeth of the barrel gear 67. Since there is no wear on the square end of the track 154, it will always allow the rack bar 66 to rise at the right point, the set screw stop 126 becoming primarily an overthrow stop. The escapement mechanism of the typewriter carriage and connected parts will now be returned to normal position since the rack bar has been released from control by the track and the rack-bar-supporting linkage has been released by movement of the latch 125 to its normal ineffective position.

It is advantageous to hold the totalizer 75 in engaging relation with the master wheel and associated mechanism by means other than the escapement mechanism of the typewriter carriage, and to hold said totalizer against displacement and vibration during a computation at more than one point. For this purpose, the rack bar 66 is provided with a cam notch 160 (Figs. 5 and 10), which normally engages the forward end of an arm 161 fast on a rock shaft 162 journaled in the framework of the master-wheel mechanism, and has fast thereto at its left end a downwardly-extending arm 163, the lower end of which engages a detent lever 164 pivoted at 165 on the framework of the master-wheel mechanism. The cam notch 160 is so formed as to rock the arm 161 and connected parts in clockwise direction during the initial part of the forward stroke of said rack bar, thereby swinging the detent lever 164 in counter-clockwise direction. This moves a detent 166 formed at its upper end into engagement with one of a plurality of notches 167 (Figs. 9 and 11) formed in the casing of the totalizer 75 at letter-space intervals, one for each dial wheel in the totalizer, thereby holding the forward end of said totalizer against vibration and accidental displacement during the reciprocation of the rack bar 66.

To simultaneously hold the rear of the totalizer 75 against vibration and accidental displacement, there is fast on the left end of the rock shaft 162 an upwardly-extending arm 168 (Figs. 5, 10 and 11), having a detent 169 formed at the upper end thereof and adapted to engage one of a plurality of notches 170 formed at the rear of the totalizer casing 75 at letter-space intervals, one for each dial wheel in the totalizer. Since each of the detents 166 and 169 is provided with a cam-faced point, they may fit the teeth with which they coöperate closely when fully seated between said teeth, thus supporting firmly both the back and front of the totalizer against twisting.

Simultaneous with the counter-clockwise swinging of the detent lever 164, a master-wheel detent 171, also formed on said lever and normally in engagement with the master wheel 73, is moved out of engagement therewith to allow said master wheel to rotate freely, but the disconnection between said detent 171 and the master wheel 73 is not dependent upon the actuation of the detent lever 164 through the intermediary of the arm 163, because the detent 171 is so formed as to be cammed out of mesh with the master wheel by the teeth of said master wheel when rotating in either direction, viz., for addition or subtraction. Either the camming action of the teeth of the master wheel on its detent 171, or the action of the arm 163 and connected parts (Fig. 12), may be effective, depending on which action is the delayed one.

It will be noted by reference to Figs. 3 and 6, that the dial wheels 76 are placed along the totalizer at letter-space distances from each other corresponding to the letter-space distances of the step-by-step movements of the typewriter carriage 30. Some of the dial wheels are of such greater width than the others that a distance of one letter-space exists between the numerals of some of the denominations along the sight-opening 77. These are punctuation spaces, and permit the printing of a punctuation mark or decimal point when one of said punctuation spaces between the numerals of the dial wheels is at the computing point.

It is advantageous to prevent the depression of any numeral key and concomitant rotation of the master wheel 73 when the blank space or punctuation space on the dial wheels of said totalizer is at the computing point. For this purpose, the totalizer 75 is provided with front blocks 176 (Fig. 9), placed in the path of the forward movement of the detent 166, which is formed on the detent lever 164, thus holding the detent lever 164 and its master-wheel detent 171 in normal position at said points, thereby preventing the actuation of the master wheel 73 and connected parts, including any of the numeral keys 21, during a computation. The totalizer 75 also has rear blocks 176 which, when in the path of the detent 169, will prevent actuation of the arm 168 and through the intermediary of the rock shaft 162 and arm 161, will hold the rack bar 66 against forward motion, and thus prevent the rotation of the master wheel 73 and connected parts, including any of the numeral keys 21. Both sets of blocks 176 of the totalizer 75 are so placed relatively to the punctuation spaces on the dial wheels 76 that said blocks will be opposite their respective detents when any one of the punctuation spaces of the totalizer is at the computing point.

The blocks 176, however, will be ineffective to prevent the actuation of numeral keys when the platen 28 has been shifted to an upper-case position, because at that time the connector 57 (Fig. 1) will be out of engagement with the pin 55 of the oscillator 51, with the result that said numeral keys may be actuated freely.

Each of the computing wheels 74 of the totalizer (Fig. 6) has formed thereon a carry-over tooth 180, which, through the intermediary of a carry-over pinion 181, is adapted to rotate the computing wheel of next higher denomination one digit distance in adding or subtracting direction, the direction depending upon the type of computation being performed. This carry-over takes place on the adjoining dial wheel when any dial wheel 76 is rotated so that the numeral "9" thereon passes the sight-opening 77, in an adding operation, or the numeral "0" passes said sight-opening in a subtracting operation, as more fully described in the herein-mentioned patents. Each of the computing wheels 74 and carry-over pinions 181 has ten teeth, and it will be evident that the master wheel may have ten teeth, or a multiple of ten.

When a carry-over action is taking place through a large number of dial wheels, the numerals on said dial wheels will tend to form a spiral at the sight-opening 77 of the totalizer, said spiral beginning at the dial wheel which is engaged with the master wheel, and extending leftwardly across the totalizer to the last dial wheel on which said carrying action is taking place. This tendency to spiral arises because the dial wheel at the extreme left of said carrying action will come to rest at the same time that the dial wheel which is at the master wheel will come to rest, with a numeral thereon exactly at the reading point, at the end of the forward stroke of the rack bar 66, while, of necessity, there is lost motion which causes each wheel to fall slightly behind the wheel at its right.

It has been found possible to allow an unusually large amount of lost motion, to permit easy operation of the mechanism, and yet correct said spiral and positively aline the numerals of the dial wheels 76 at the sight-opening 77 of the totalizer. For this purpose, these is provided for each carry-over pinion 181 a detent 184 loosely pivoted on a rod 185 (Figs. 4, 5, 6 and 8) and normally spring-pressed by a bail 186 universal to all the detents 184 (Figs. 4, 6), so that the upper end of each detent 184 will normally be in engagement with its carry-over pinion 181 to hold said pinion in its normal position and against accidental displacement. The detents 184 are assisted to their effective position by spring-operated bell-cranks 187, which are held against the detents by spring-pressed plungers 188 to hold their carry-over pinions 181 in alinement and against accidental displacement when the universal bail 186 (Figs. 4 and 8) is moved to ineffective position at the actuation of the master wheel (Fig. 12), as will hereinafter appear. When the carry-over action through a large number of dial wheels has taken place, and the numerals thereon tend to form a spiral relative to the sight-opening 77, the associated parts, including the detent levers 184, will assume a corresponding position. At the end of the downward stroke of the numeral key 21, the typewriter escapement mechanism will be actuated, and through the intermediary of its connections with the rock shaft 136 (Fig. 7), will rock said shaft in the herein-described manner in clockwise direction, so that a spirally-formed cam 189 fast thereon (Figs. 5 and 8) will swing into engagement with downward projections 190 of the detents 184, so as to rock said detents in counter-clockwise direction (as seen in Figs. 7 and 8) *seriatim*, beginning with the displaced detent of lowest denomination and ending with the displaced detent of highest denomination. This moves the upper ends of said detents into engagement with the teeth of their respective carry-over pinions 181 serially, to complete the rotation of said pinions, and thus aline said pinions and associated computing and dial wheels 74 and 76 respectively, thus bringing the numerals on the dial wheels 76 into exact alinement with the sight-opening 77 formed in the casing of the totalizer 75. The upper ends of the detents 184 are so formed to move their respective carry-over pinions 181 during said spiral correction, in the carry-over action, as to complete the rotation of said carry-over pinions into alinement either in an adding operation or in a subtracting operation. The spiral cam is made of a solid piece of metal, thus giving it considerable momentum, and this will enable the cam to offset any lost motion of the parts driving it. To positively arrest the spiral cam, its shaft 136 is provided with an arm 191 which is adapted to strike a heel 191ª on the detent arm 164 at the moment the cam should be arrested. The arm 91 positively moves the locking arm 166 to ineffective position first by a camming action on the body of the arm 164, and later by striking the heel 191ª with a camming action.

It is advantageous that those of the carry-over pinions 181, which are in mesh with the computing wheels 74 of the totalizer and which may be actuated in a carry-over operation, should be entirely free to rotate in either direction. To free them there is in engagement with the teeth of the master wheel 73 (Fig. 12) a pawl 192 also pivoted on the rod 185 and having a forwardly extending arm 193, the end of which underlies the universal bail 186. At the initial part of a rotation of the master wheel 73, the teeth thereof will cam the pawl 192 out of engagement with the master wheel to swing said pawl 192 and arm 193 in clockwise direction (as seen in Fig. 12), raising the bail 186, out of engagement with the carry-over-wheel detents 184, so that all of said detents will be free from the influence of the spring 194 of the universal bail 186. Concomitantly, the bail 186 which underlies an arm 195 on the detent lever 164, will swing said lever in counter-clockwise direction, so that its detent 166 will be moved into engagement with one of the notches 167 formed in the totalizer to hold said totalizer against vibration or accidental displacement. If a block 176 should stand in the path of the counter-clockwise motion of said detent 166, the pawl 192 being held in engagement with the master wheel by the arm 195 of the detent lever 164 through the intermediary of the bail 186, will prevent the rotation of the master wheel 73 and associated mechanism.

If the pawl or detent 192 for the master wheel, or any of the detents 184 for the carry-over wheels, happen to be out of proper engagement with their respective wheels and riding on the apices of the teeth, then the totalizer 75 and the typewriter carriage 30 will be locked against traveling movement. When any of these detents is misplaced, bail 186 is held in raised position, and by means of arm 195 holds lever 164 in effective position. As a result of this action, collision of the teeth of a misplaced master wheel or of a misplaced carry-over wheel with computing wheels of the totalizer and consequent damage will be avoided.

The carry-over part of the computing mechanism in the present invention somewhat resembles that shown in my prior application No. 24,390, filed April 28, 1915 (now Patent No. 1,308,506, dated July 1, 1919), and like that, includes computing wheels 74 which may be normally held locked outside the computing zone by alining bars 199 formed on the wings 200. Within the computing zone the computing wheels are held locked by the carry-over wheels 181 with which they mesh *seriatim* as the typewriter carriage travels along. These carry-over wheels are normally held locked against turning by means of the detents 184, as described above, which are normally urged to locking position by the above-described bell-cranks 187. The detents 184 are released, beginning with the right-hand one, as the typewriter carriage travels along through the computing zone, and this is brought about by a bar 196 fast on the totalizer and provided with end cams 197, these cams and the surface of the bar being adapted to engage and depress rounded bosses 198 on the upper surface of the bell-cranks 187. The means for moving bell-cranks 187 to ineffective position is in general the same as that disclosed in my said prior application, Serial No. 274,634.

Whenever any bell-crank is thus depressed, it releases its detent 184, thereby allowing said detent to be cammed out by turning its carry-over wheel 181, the faces of the detent where it engages said wheel being suitably shaped for this purpose. The detents 184 are, however, still normally held in engagement with the carry-over wheels 181 because the universal bail 186 holds them in that position, as has been described above.

When, however, a numeral key is depressed, the universal bail 186, as has been described above, releases all the detents 184 for the purpose of permitting a carry-over to be made. Owing to the fact that the only bell-cranks 187 which have been made ineffective are those between the master wheel and the highest wheel of the totalizer, the detents 184 which are released from both the universal bail 186 and the bell-cranks 187, will only be those which engage the carry-over wheels within the totalizer. These carry-over wheels which are within the limits of the totalizer and are engaged by the computing wheels are, therefore, free to turn, so far as mechanism outside the totalizer is concerned, while all the others are locked both normally and while the master wheel is turning. The carry-over wheels 181, however, which have been released in the manner described above, are not really free to turn, because the detents 184 are provided with connections which permit the freed carry-over wheels 181 to form a locking train with the computing wheels 74 within the totalizer. For this purpose the computing wheels 74 have carry-over controllers or releasers 201 similar to those in my last-named application, which form locking members in the carry-over train, and these releasers 201 are provided with downwardly-extending arms 202 which control the detents 184. For the purpose of thus controlling the detents 184, said detents are provided with double cambacks 203 near their upper ends, which are so positioned that they will be engaged by cam bosses 204 on the lower ends of the carry-over releasers 201, the connection being such that when the typewriter carriage is at rest in the adding zone, each computing wheel to the left of the master wheel has its carry-over releaser 201 controlling a detent 184, while, when the typewriter carriage feeds along another letter-space, the system of releasers 201 will travel along so that each releaser engages the detent 184 immediately to the left of the one which is previously engaged. The carry-over releasers, therefore, normally each hold a carry-over wheel 181 locked by means of its detent 184, and the releasers 201 are so positioned that the releaser which is controlled by one computing wheel 74 controls the detent 184 of the carry-over wheel 181 which is to drive the computing wheel next higher in denomination.

The carry-over releasers 201 have been described in some detail in my prior application last-named, and each includes a Geneva locking portion 205 which bears against a periphery 206 on the computing wheel which controls it. The periphery 206 is, however, cut away at 207 to permit the releaser to release its detent 184 and therefore permit a carry-over to be made by the carry-over teeth described above, the connections being such that the cut-away portion 207 is opposite the Geneva lock part of the releaser 201 at the moment their computing wheel is turning its dial wheel from "0" to "9," and vice versa.

It will be noted, as a result of the above construction, that in a carry-over operation no springs have to be released by the pressure of the typewriter key other than those normally released thereby, thus making the operation of the machine easy, while at the same time, provision is made for the positive control of the parts during a carry-over operation. As pointed out above, even though there may be a great deal of lost motion, if advisable to secure smoothness of operation, such lost motion is fully taken up by the spiral carry-over assisting member 189.

Variations may be resorted to within the scope of the invention, and portions of the improvements may be used without others.

Having thus described my invention, I claim:

1. In a computing machine, the combination with numeral keys and a master wheel, of numeral-key-actuated means for driving said master wheel, including a reciprocating rack, a pinion driven by said rack, bell-cranks each having a pin-and-slot connection with said rack, one of said bell-cranks supporting said rack adjacent said pinion, a link connecting said bell-cranks, and means to swing the bell-crank supporting the rack at a point adjacent said pinion, and consequently to swing the other bell-crank by means of said link, whereby said rack may be moved into and out of engagement with said pinion.

2. In a combined typewriting and computing machine, the combination with typewriter numeral keys and a master wheel, of key-controlled means for actuating said master wheel, comprising a reciprocating rack, a pinion by which it actuates said master wheel, means for holding said rack in engagement with said pinion during movements in one direction, a movable track adapted to hold said rack clear of said pinion, and a cam connection between said rack and said track for moving said track to ineffective position to make the track effective on the rack.

3. In a combined typewriting and computing machine, the combination with typewriter numeral keys and a master wheel, of key-controlled means for actuating said master wheel, comprising a reciprocating rack, a pinion by which it actuates said master wheel during movements in one direction, means for holding said rack in engagement with said pinion in actuating it, a movable track adapted to hold said rack clear of said pinion, a cam connection between said rack and said track for moving said track to ineffective position to make the track effective on the rack, and means for moving said rack clear of said pinion, including a movable support for said rack adjacent said pinion, a second movable support for said rack, a connection between said supports to cause synchronous movement thereof, and means, acting through the first-mentioned support, to move said supports and consequently said rack.

4. In a machine of the class described, the combination with a pinion for effecting a computation, of a reciprocating rack for actuating said pinion in one direction, means for returning said rack clear of said pinion in the opposite direction, a movable track for holding the rack clear of the pinion, said track adapted to release said rack at the end of the return of said rack, and a stop for arresting said rack.

5. In a machine of the class described, the combination with a pinion for effecting a computation, of a reciprocating rack for actuating said pinion in one direction, means for returning said rack clear of said pinion in the opposite direction, a movable track for holding the rack clear of the pinion, said track adapted to release said rack at the end of the return of said rack, a stop for arresting the return movement of said rack at the moment of its release from the track, and means for moving the rack into and out of mesh with the pinion, comprising a bell-crank having a pin-and-slot connection with said rack to support the same at a point substantially vertically beneath said pinion, a shaft on which said bell-crank is fixed, and means for rocking said shaft.

6. In a computing machine, the combination with numeral keys and a pinion through which computation is effected, of a reciprocating rack for actuating said pinion, numeral-key-actuated means for reciprocating said rack, and numeral-key-actuated means for moving said rack into and out of mesh with said pinion, comprising a bell-crank to support the forward end of said rack adjacent said pinion, a bell-crank to support the rear end of said rack, connections between said rack ad said bell-cranks whereby the former is slidably supported by the latter, cam means for actuating the forward bell-crank, and a connection between said bell-cranks whereby the rearward bell-crank will be actuated by means of the forward one.

7. In a combined typewriting and computing machine, the combination with a traveling typewriter carriage, an escapement therefor including a universal bar and a pinion for effecting computations, of a detent adapted to arrest said pinion at the end of a computation, a cam for making said detent positively effective and ineffective, and means for operating said cam by said universal bar.

8. In a combined typewriting and computing machine, the combination with a traveling typewriter carriage, an escapement therefor including a universal bar and a pinion for effecting computations, of means, including a detent adapted to arrest said pinion at the end of a computation, a cam for making said detent positively effective and ineffective, means for operating said cam by said universal bar, a reciprocating rack for rotating said pinion to effect such computations, and means operated by said universal bar for moving said rack out of mesh with said pinion for a return stroke at the time said detent becomes effective.

9. In a combined typewriting and computing machine, the combination with a typewriter universal bar and a pinion for effecting computations, of means, including a detent adapted to arrest said pinion at the end of a computation, a cam for making said detent positively effective and ineffective, means for operating said cam by said universal bar, a reciprocating rack for rotating said pinion to effect such computations, means operated by said universal bar for moving said rack out of mesh with said pinion for a return stroke at the time said detent becomes effective, and a track movable to effective position to hold said rack clear of said pinion, the connections being such that when said rack is clear of its pinion it holds the universal bar in its operated position.

10. In a combined typewriting and computing machine, the combination with a typewriter universal bar, a computing pinion and a rack adapted to engage said pinion to effect a computation thereby, of a track along which said rack is slidable to hold it clear of said pinion, and positive connections between said universal bar and said rack, whereby when said rack is clear of its pinion the universal bar is maintained in its operated position.

11. The combination with a pinion, of means including a reciprocating rack bar for rotating said pinion, typewriter escapement mechanism, pivoted members having pin-and-slot connections with said rack bar, means for connecting said pivoted members to cause synchronous movement thereof, and camming means operated from said escapement mechanism for actuating one of said pivoted members to move said rack bar into and out of mesh with said pinion.

12. In a computing machine, the combination with a reciprocating rack, of a track pivoted alongside thereof, means whereby the rack moves forward above said track, a cam device whereby the rack in moving downward moves said track to one side, and means for swinging said track to hold said rack in its depressed position during its return movement.

13. In a combined typewriting and computing machine, the combination with typewriter numeral keys and a typewriter escapement comprising a loose dog and a fixed dog, of a full-stroke device for said keys, and means for controlling said full-stroke device from said loose dog.

14. In a combined typewriting and computing machine, the combination with typewriter numeral keys and a typewriter escapement mechanism, of a full-stroke device for said keys effective on both strokes of said keys, and means for controlling said full-stroke device from said escapement mechanism.

15. In a combined typewriting and computing machine, the combination with typewriter numeral keys and a typewriter escapement mechanism, of a full-stroke device for said keys effective on both strokes of said keys, means for controlling said full-stroke device from said escapement mechanism, and a yieldable connection between said full-stroke device and said escapement mechanism.

16. In a combined typewriting and computing machine, the combination with typewriter numeral keys and a typewriter escapement mechanism, of a full-stroke device for said keys normally effective on down-strokes of said keys, and means controlled by said escapement mechanism for rendering said full-stroke device effective on up-strokes of said keys, and at the same time effective to prevent depression of any other keys.

17. In a combined typewriting and computing machine, the combination with typewriter numeral keys and a typewriter escapement mechanism, of a full-stroke device for said keys effective on both strokes of said keys, means for controlling said full-stroke device from said escapement mechanism, and a yieldable connection between said full-stroke device and said escapement mechanism, said full-stroke device being rendered effective by any of said numeral keys as it reaches the end of its down-stroke to prevent depression of any other of said numeral keys.

18. In a combined typewriting and computing machine, the combination with typewriter numeral keys and a master wheel actuated thereby, of a reciprocating rack for actuating said master wheel, connections whereby said keys reciprocate said rack in one direction on a down-stroke, and in the opposite direction on the up-stroke, means whereby said rack prevents the depression of a second key until any previously depressed key has been returned to normal position, and means for rendering said rack effective on said preventing means during the up-stroke of the previously depressed key.

19. In a combined typewriting and computing machine, the combination with typewriter numeral keys and a master wheel actuated thereby, of a pinion for actuating said master wheel, a reciprocating rack for actuating said pinion, a full-stroke device for said keys, means whereby said rack controls said full-stroke device to control operation of said keys, and means to coöperate with said rack to render the latter effective on said controlling means.

20. In a combined typewriting and computing machine, the combination with typewriter numeral keys and a master wheel actuated thereby, of a pinion for actuating said master wheel, a reciprocating rack for actuating said pinion, a full-stroke device for said keys, means whereby said rack controls said full-stroke device to control operation of said keys, said full-stroke device being rendered effective by any one of said numeral keys as it reaches the end of its down-stroke to prevent depression of any other of said keys, and means to coöperate with said rack during the up-stroke of the depressed key to render said rack effective on the controlling means for said full-stroke device.

21. In a combined typewriting and computing machine, the combination with typewriter numeral keys and a master wheel actuated thereby, of a pinion for actuating said master wheel, a reciprocating rack bar for actuating said pinion, a full-stroke device for said keys, means whereby said rack controls said full-stroke device to control operation of said keys, and a typewriter escapement forming part of the connection between the rack and the full-stroke device.

22. In a combined typewriting and computing machine, the combination with typewriter numeral keys and a master wheel actuated thereby, of a pinion for actuating said master wheel, a reciprocating rack for actuating said pinion, a full-stroke device for said keys, means whereby said rack controls said full-stroke device to control operation of said keys, a typewriter escapement comprising a fixed and a loose dog, and means whereby said loose dog controls said full-stroke device.

23. In a combined typewriting and computing machine, the combination with a series of numeral keys, of pendents for said keys, a double pawl coöperating with each pendent adapted to form a full-stroke device therefor, a typewriter escapement mechanism, and means for operating said double pawls by said escapement mechanism.

24. The combination with a pinion, of means including a reciprocating rack bar for rotating said pinion, and means for moving said rack bar into and out of engagement with said pinion, including two movable supports on which said rack bar is slidably mounted, a connection between said supports to cause synchronous movement thereof, and cam means, acting through one of said supports, to move said rack bar into engagement with said pinion and to lock said rack bar against disengagement therefrom.

25. In a combined typewriting and computing machine, the combination with typewriter numeral keys and a full-stroke pawl for each key effective only on up-strokes thereof, of a typewriter escapement mechanism, means for actuating said full-stroke pawls by said escapement mechanism, said escapement mechanism comprising a fixed dog, a loose dog, and a universal bar whereby said dogs are actuated, and a member operated by said loose dog to actuate said full-stroke pawls.

26. In a combined typewriting and computing machine, the combination with mechanism having a variable throw forming a differential actuating part, of a typewriter escapement, typewriter numeral keys, a full-stroke mechanism for said keys, a connection from the actuating part to the escapement mechanism, a loose dog forming part of said escapement mechanism, and a connection from said loose dog to the full-stroke mechanism.

27. In a combined typewriting and computing machine, the combination with computing mechanism a typewriter escapement wheel and a universal bar, of a dog rocker comprising a fixed dog, a loose dog, a member pivoted to said dog rocker and operated by said loose dog, and a connection from said member to the computing mechanism.

28. In a combined typewriting and computing machine, the combination with computing mechanism a typewriter escapement wheel and a universal bar, of a dog rocker comprising a fixed dog, a loose dog, a member pivoted to said dog rocker and operated by said loose dog, a connection from said member to the computing mechanism, means whereby said escapement wheel normally holds said loose dog against said member, and a spring drawing said loose dog away from said member when free from said escapement wheel.

29. In a combined typewriting and computing machine the combination with computing mechanism, of a typewriter escapement wheel, a dog rocker comprising a fixed dog coöperating with said wheel, a loose dog also coöperating with said wheel and means to insure proper actuation of said computing mechanism, including, a bell-crank pivoted on said dog rocker and swung to effective position when said loose dog engages the escapement wheel, a link extending from said bell-crank, and a spring tending to make said link swing said bell-crank against said loose dog.

30. In a combined typewriting and computing machine, the combination with a typewriter escapement wheel, of a dog rocker comprising a fixed dog coöperating with said wheel, a loose dog also coöperating with said wheel, a bell-crank pivoted on said dog rocker and swung to effective position when said loose dog engages the escapement wheel, a link extending from said bell-crank, a spring tending to make said link swing said bell-crank against said loose dog, connections from said link to the computing mechanism, said connections including a pin-and-slot connection, and a spring normally holding said pin-and-slot connection closed.

31. In a combined typewriting and computing machine, the combination with a typewriter escapement wheel and a dog rocker therefor, comprising a fixed dog, of a loose dog on said dog rocker, a bell-crank pivoted on said rocker and extending substantially in the plane of said loose dog, typewriter numeral keys, pawls adapted to prevent depression of any key, but held ineffective by said dog rocker, and a universal bar for operating said rocker to make said dogs effective.

32. In a combined typewriting and computing machine, the combination with a typewriter escapement wheel and a dog rocker therefor, comprising a fixed dog, of a loose dog on said dog rocker, a bell-crank pivoted on said rocker and extending substantially in the plane of said loose dog, typewriter numeral keys, pawls adapted to prevent depression of any key, but held ineffective by said dog rocker, a universal bar for operating said rocker to make said dogs effective, and spring- connections whereby each pawl becomes effective, said springs making up for minor variations in the mechanism.

33. In a computing machine, the combination with computing wheels, carry-over members, and means for effecting a relative traveling movement between said computing wheels and said carry-over members, of means for actuating said computing wheels, means for completing carry-overs, including detents coöperating with said carry-over members and means, actuated each time a digit is computed, to engage said detents *seriatim*, and means whereby each computing wheel locks one of said detents in engagement with the carry-over member positioned to effect carry-over to the next higher computing wheel, except when the lower computing wheel is in proper position for a carry-over to be effected.

34. In a computing machine, the combination with computing wheels and a carry-over mechanism therefor, including carry-over members and detents thereof, of means, actuated each time a digit is computed, for driving said detents *seriatim* to insure the completion of the movement of said carry-over members, and means whereby each computing wheel locks in engaging position the detent of the carry-over member positioned to transmit movement to the computing wheel of the next higher order, except when the computing wheel of lower order is in the proper position for carry-over to be effected.

35. In a computing machine, the combination with numeral keys and numeral-key-actuated computing means, including computing wheels, carry-over members for transmitting movement from any of said computing wheels to the next higher computing wheel, and detents for said carry-over members, of means, actuated each time a digit is computed, for driving said detents *seriatim* to insure the completion of the movement of said carry-over members, and means whereby each computing wheel locks in engaging position the detent of the carry-over member positioned to transmit movement to the computing wheel of the next higher order, except when the computing wheel of lower order is in the proper position for carry-over to be effected.

36. In a computing machine, the combination with numeral keys and numeral-key-actuated computing means, including computing wheels, carry-over wheels for transmitting movement from any of said computing wheels to the next higher computing wheel, and detents for said carry-over wheels, of means, actuated each time a digit is computed, for driving said detents *seriatim* to insure the completion of the movement of said carry-over wheels, and means whereby each computing wheel locks in engaging position the detent of the carry-over wheel positioned to transmit movement to the computing wheel of the next higher order, except when the computing wheel of lower order is in the proper position for carry-over to be effected.

37. In a combined typewriting and computing machine, the combination with computing wheels forming part of a traveling carriage, of carry-over devices relatively to which said wheels travel to come into effective relation therewith, spring detents normally holding said carry-over devices, means for making said detents ineffective by travel of said carriage, supplementary detenting means, numeral-key-computing means adapted to release said secondary detenting means, and carry-over locking devices extending from said carriage to said carry-over devices.

38. The combination with a carry-over device and a normally effective lock therefor, of carriage-operated means for releasing said lock, detent means for said carry-over device, key-operated means for releasing said detent means, and carriage-operated means for locking the completely released device.

39. In a computing machine, the combination with a traveling carriage and computing wheels carried thereby, of carry-over wheels to be engaged by said computing wheels as the carriage travels past said carry-over wheels, detents for said carry-over wheels, spring-pressed members to engage said detents and maintain them in effective position, carriage-actuated means for withdrawing said spring-pressed members from effective position, devices mounted on said carriage and controlled by said computing wheels for engaging said detents and locking the same in effective position, except when said computing wheels are positioned for carry-over action, and supplementary means universal to all of said detents for maintaining the same in effective position.

40. In a computing machine, the combination with a traveling totalizer, including computing wheels, of carry-over wheels so positioned as to be engaged by the computing wheels during the travel of the latter past the former, detents for said carry-over wheels, members yieldingly urged to position to hold said detents in effective position, devices controlled by said computing wheels and mounted in said totalizer for engaging said detents and locking them in effective position, totalizer-actuated means to move to ineffective position said holding members corresponding to the carry-over wheels in engagement with the computing wheels, a spring-pressed bail universal to said detents, and key-operated means for withdrawing said bail to release said detents therefrom.

41. In a computing machine, the combination with a traveling totalizer, including computing wheels, of carry-over wheels engaged by said computing wheels as the latter travel past the former, detents for said carry-over wheels, members individual to said detents for holding the same in effective position, means individual to said holding members for yieldingly urging the same to effective position, means, including a bail universal to said detents, for urging said detents to effective position, totalizer-actuated means for moving to ineffective position the holding members corresponding to the carry-over wheels engaged by said computing wheels, key-operated means for withdrawing said bail from engagement with said detents, and computing-wheel-controlled devices mounted upon said totalizer for engaging said detents and locking the same in effective position, said computing-wheel-controlled devices being brought into engagement with said detents upon release of the latter by means of said totalizer-actuated means, and being effective to lock said carry-over wheels except when said computing wheels are in carry-over positions.

42. In a computing machine, the combination with a pinion for effecting computations, of a reciprocating rack for driving said pinion, means for moving said rack out of mesh with said pinion at the end of its effective stroke, a latch holding said rack so out of mesh, a movable track normally below said rack, but adapted to lie above said rack when in its idle stroke, said track releasing said rack at the end of its idle stroke, a stop for arresting said rack on its idle stroke, and means operated by said stop for positively releasing said latch.

43. The combination with computing wheels, of a master wheel for driving said computing wheels seriatim, carry-over wheels for said computing wheels, detents individual to said carry-over wheels, and a device for alining said detents having an engaging portion so shaped as to engage said detents seriatim and a dwell portion for locking said detents in position after alinement thereof.

44. In combination, a series of computing wheels, means for driving said computing wheels seriatim, a series of carry-over wheels for said computing wheels, detents, one for each of said carry-over wheels, and an alining device comprising a member having a portion shaped to engage said detents in succession and a cylindrical portion to lock said detents in engagement with their respective carry-over wheels.

45. The combination with a series of computing wheels, of a master wheel for said computing wheels arranged to drive said computing wheels one by one with a relative step-by-step movement between them for this purpose, carry-over wheels for said computing wheels with a relative step-by-step movement between the carry-over wheels and the computing wheels, means, including justifying detents, for alining said carry-over wheels, so that relative motion between the computing wheels and the carry-over wheels will be unobstructed, and locking means operated by a disalined carry-over wheel acting through its associated detent to prevent relative movement between said computing wheels and both said master wheel and carry-over wheels.

46. In a combined typewriting and computing machine, the combination with typewriter numeral keys and a pinion driven thereby to effect computations, of a reciprocating rack operated by said keys for driving said pinion, a typewriter escapement, a detent for arresting said pinion, means whereby said detent is operated by said typewriter escapement, connections whereby said typewriter escapement moves said rack into and out of effective position, and means whereby said rack controls said typewriter escapement.

47. In a combined typewriting and computing machine, the combination with typewriting numeral keys and a pinion driven thereby to effect computations, of a reciprocating rack operated by said keys for driving said pinion, a typewriter escapement, a detent for arresting said pinion, means whereby said detent is operated by said typewriter escapement, connections whereby said typewriter escapement moves said rack into and out of effective position, said escapement having a to and fro motion, and means whereby when said escapement has moved in one direction and moved said rack out of mesh, said rack holds said escapement against further operation until the end of the return of said rack.

48. In a combined typewriting and computing machine, the combination with typewriter numeral keys and a pinion driven thereby to effect computations, of a reciprocating rack operated by said keys for driving said pinion, a typewriter escapement, a detent for arresting said pinion, means whereby said detent is operated by said typewriter escapement, connections whereby said typewriter escapement moves said rack into and out of effective position, said escapement having a to and fro motion, and means whereby when said escapement has moved in one direction and moved said rack out of mesh, said rack holds said escapement against further operation until the end of the return motion of said rack, said means comprising a normally ineffective track adapted to be effective on the return stroke of said rack and to hold said rack positively ineffective until the completion of the return stroke thereof.

49. In a computing machine, the combination with numeral keys and a traveling carriage, of a totalizer forming part of said carriage, a master wheel for actuating said totalizer, a rack at the front and a rack at the rear of said totalizer, and means for locking said totalizer against traveling by both its front and its rear rack when said master wheel is turning.

50. In a combined typewriting and computing machine, the combination with numeral keys and a traveling carriage, of a totalizer forming part of said carriage, a pinion for effecting computations in said totalizer, teeth at the front and at the rear of said totalizer, means for locking said totalizer against traveling by both its front and its rear teeth when said pinion is turning, a rack for driving said pinion adapted to mesh therewith on one stroke, and to be out of mesh at the opposite stroke, and a tappet operated by said rack for controlling said locking means.

51. In a combined typewriting and computing machine, the combination with numeral keys and a traveling carriage, of a totalizer forming part of said carriage, a pinion for effecting computations in said totalizer, teeth at the front and at the rear of said totalizer, means for locking said totalizer against traveling by both its front and its rear teeth when said pinion is turning, a rack for driving said pinion adapted to mesh therewith on one stroke, and to be out of mesh at the opposite stroke, a tappet operated by said rack for controlling said locking means, a typewriter escapement mechanism for feeding said carriage, said escapement having a to and fro motion, and means for making the completion of said to and fro motion impossible until said rack is in normal position.

52. In a combined typewriting and computing machine, the combination with typewriter numeral keys and a traveling carriage, of a totalizer forming part of said carriage, a master wheel for actuating said totalizer, teeth at the front and teeth at the rear of said totalizer, a separate locking dog coöperating with each set of teeth, and means for operating said dogs simultaneously to hold said totalizer against traveling.

53. In a combined typewriting and computing machine, the combination with typewriter numeral keys and a traveling carriage, of a totalizer forming part of said carriage, a master wheel for actuating said totalizer, teeth at the front and teeth at the rear of said totalizer, a separate locking dog coöperating with each set of teeth, a pinion for effecting computations in said totalizer, a rack moving into and out of mesh with said pinion, means operated by said rack for positively moving said dogs into effective position, a carry-over drive device, and means operated by said carry-over drive device for positively making said dogs ineffective.

54. In a combined typewriting and computing machine, the combination with typewriter numeral keys and a traveling carriage, of a totalizer forming part of said carriage, a master wheel for actuating said totalizer, a carry-over drive device, teeth at the front and teeth at the rear of said totalizer, a separate locking dog coöperating with each set of teeth, a pinion for effecting computations in said totalizer, a rack moving into and out of mesh with said pinion, a follower normally holding said dogs ineffective but moved by said rack to make said dogs effective, and means operated by said carry-over drive device for positively making said dogs ineffective.

55. In a computing machine, the combination with numeral keys and a traveling carriage, of a totalizer, comprising computing wheels, forming part of said carriage, a master wheel for actuating said totalizer, a rack at the front and at the rear of said totalizer, means for locking said totalizer against traveling by both its front and rear racks when said master wheel is turning, carry-over devices for said computing wheels, means for driving said carry-over devices independently of said master wheel, and means for positively releasing said totalizer from its locks by the completion of said carry-over.

56. In a computing machine, the combination with a traveling carriage and computing wheels forming part of said carriage, of carry-over devices relatively to which said carriage moves, means for unlocking said carry-over devices seriatim in groups by said carriage travel, keys controlling the turning of said wheels, supplementary locking means tending to lock said devices but released at the operation of said keys, and carry-over controlling devices extending from said wheels and co-operating with said devices to lock the carry-over devices otherwise released.

57. In a computing machine, the combination with a reciprocating rack, of a pinion which it operates, a master wheel driven by said pinion, a movable track adapted to hold said rack during its travel in one direction, and a cam on said rack adapted to cam said track to permit it to come to effective position.

58. In a combined typewriting and computing machine, the combination with typewriting mechanism, including an escapement and numeral keys, of computing mechanism, a loose dog forming part of said escapement, said loose dog normally under tension, and means for locking said computing mechanism through said numeral keys whenever said loose dog is released from its tension.

59. In a combined typewriting and computing machine, the combination with typewriting mechanism, including an escapement and numeral keys, of computing mechanism, a loose dog forming part of said escapement, said loose dog normally under tension, a back-space mechanism, and means for locking said computing mechanism through said numeral keys by release of said loose dog when the back-space mechanism is effective.

60. In a combined typewriting and computing machine, the combination with typewriting mechanism, including an escapement and numeral keys, of computing mechanism, a loose dog forming part of said escapement, said loose dog normally under tension, tabulating mechanism, and means for locking said computing mechanism through said numeral keys by release of said loose dog when the tabulating mechanism is effective.

61. In a combined typewriting and computing machine, the combination with typewriting mechanism, including an escapement and numeral keys, of computing mechanism, a loose dog forming part of said escapement, said loose dog normally under tension, a carriage-release key, and means for locking said computing mechanism through said numeral keys by release of said loose dog when the carriage-release key is effective.

62. In a combined typewriting and computing machine, the combination with typewriting mechanism, including typewriter numeral keys and a universal bar, of computing mechanism operable by said keys, connections from said computing mechanism to said universal bar for timing the parts of the computing mechanism, a dog forming part of the typewriter escapement mechanism, and connections from said dog for controlling the numeral keys.

63. In a computing machine, the combination with numeral keys and a traveling carriage, of devices for preventing the simultaneous depression of two numeral keys, a full-stroke device, an escapement forming part of the typewriting mechanism and comprising a loose dog, and connections whereby said full-stroke mechanism coöperates with said simultaneous depression devices to prevent the simultaneous depression of two keys, said full-stroke device including means for preventing the depression of one key while another is rising.

64. In a combined typewriting and computing machine, the combination with a traveling carriage and an escapement therefor, of a loose dog forming part of said escapement and normally holding said carriage, a stop for arresting said carriage, said loose dog normally tensioned by the usual escapement wheel, and means whereby the stopping of the carriage releases the loose dog to arrest the operation of the numeral keys.

65. The combination with a series of computing wheels, of a master wheel for driving said computing wheels one by one, carry-over wheels for said computing wheels, justifying detents for alining said carry-over wheels, a lock for preventing a relative traveling movement between said computing wheels and said master and carry-over wheels, while said master wheel is being driven to rotate said computing wheels, and connections between said detents and said lock enabling any one of said carry-over wheels to bring said lock into play when out of alinement.

66. The combination with a series of computing wheels, of a master wheel for driving said computing wheels one by one, a series of carry-over wheels for said computing wheels, a traveling carriage for effecting a relative movement between said computing wheels and both said master and said carry-over wheels, a lock for said carriage brought into play when said master wheel is driving said computing wheels, detents for said master and carry-over wheels, and a bail universal to said detents and connected to operate said lock so that when any one of said carry-over wheels or said master wheel is out of alinement, said lock will be brought into play to prevent a destructive traveling movement of said carriage.

67. In a combined typewriting and computing machine, the combination with a typewriter carriage and a totalizer adjustable to travel therewith, of numeral and alphabet keys for printing in letter-spaces determined by the travel of said carriage, an escapement mechanism for letter-feeding said carriage, pointing-off control devices attached to said totalizer, a case-shift device, and means whereby, when said case-shift device is actuated, the pointing-off device is ineffective.

68. In a combined typewriting and computing machine, the combination with a typewriter carriage and a totalizer adjustable to travel therewith, of numeral and alphabet keys for printing in letter-spaces determined by the travel of said carriage, an escapement mechanism for letter-feeding said carriage, pointing-off devices attached to said totalizer adapted to lock said numeral keys against actuation, a case-shift device, and means whereby, when said case-shift device is actuated, the pointing-off device is ineffective to lock said numeral keys against actuation.

69. In a combined typewriting and computing machine, the combination with a typewriter carriage and a totalizer adjustable to travel therewith, of carry-over devices for said totalizer including movable members, typewriter numeral keys adapted to compute in said totalizer, a device effective at the depression of a numeral key for locking said carriage against travel, an alining device for said carry-over devices adapted to occupy a normal position when the carry-over devices are alined, and an abnormal position when not so alined, a connection whereby said alining device makes said locking device effective whenever the alining device is in its abnormal position, and means for positively releasing said locking device at the completion of the alining of said carry-over devices after the depression of a numeral key.

70. In a combined typewriting and computing machine, the combination with typewriter numeral keys and a traveling carriage, of a totalizer forming part of said carriage, a master wheel for actuating said totalizer, teeth on said totalizer, a locking dog for coöperating with said teeth, a pinion for effecting computations in said totalizer, devices for turning said pinion, means operated by said devices for positively moving said dog into effective position to lock said carriage, a carry-over drive device, and means operated by said carry-over drive device for positively making said dog ineffective.

71. In a combined typewriting and computing machine, the combination with typewriter numeral keys and a traveling carriage, of a totalizer forming part of said carriage, a master wheel for actuating said totalizer, teeth on said totalizer, a locking dog for coöperating with said teeth, a pinion for effecting computations in said totalizer, devices for turning said pinion, means operated by said devices for positively moving said dog into effective position to lock said carriage, a carry-over drive device, means operated by said carry-over drive device for positively making said dog ineffective, a carry-over alining device adapted to occupy a normal and an abnormal position, and means for positively holding said dog in effective position when said alining device is in abnormal position.

72. In a computing machine, the combination with a traveling totalizer comprising computing wheels, of carry-over wheels, numeral keys, numeral-key-actuated means for actuating said computing wheels, means rendered effective by the depression of a numeral key for locking said totalizer against traveling, a detent for each of said carry-over wheels, means whereby said locking means will be rendered effective whenever one of said detents is held out of locking engagement with the corresponding carry-over wheel, an alining device for driving said detents *seriatim* into engagement with their carry-over wheels, and means whereby said alining device will render said locking means ineffective upon completion of its alining movement.

73. In a computing machine, the combination with numeral keys and a traveling totalizer, of numeral-key-actuated means for actuating said totalizer, carry-over wheels, teeth on said totalizer, a locking dog to coöperate with said teeth, means operated by said actuating means for positively moving said dog into effective position, alining detents, one for each carry-over wheel, a device for driving said detents *seriatim* into engagement with their respective carry-over wheels, means whereby said driving device positively moves said locking dog to ineffective position, and connections whereby any detent held out of effective engagement with the corresponding carry-over wheel will positively hold said dog in effective position.

74. In combination, a totalizer, a member to coöperate with said totalizer to effect computation, feeding means to cause relative movement between said totalizer and said member, locking means to prevent such relative movement, justifying means for said member, including a detent to retain said member in justified position, and means rendered effective by said detent when said member is not in justified position to render effective said locking means.

75. The combination with computing wheels, of a master wheel for driving said computing wheels, carry-over wheels for said computing wheels, detents for certain of said wheels, alining means for said detents, a rack bar connectible to drive said master wheel, and means, operated from said alining means, for shifting said rack bar between effective and ineffective driving positions.

76. In a combined typewriting and computing machine, the combination with a traveling totalizer, comprising dial wheels and computing wheels, of a master wheel, carry-over wheels, said master wheel being effective to rotate said computing wheels and said carry-over wheels through angular distances, and means controlled from said carry-over wheels for preventing the traveling movement of said totalizer when one of the carry-over wheels is in a fraction of an angular position.

77. In a combined typewriting and computing machine, the combination with a carriage and a traveling totalizer, comprising dial wheels and computing wheels, of a master wheel, carry-over wheels, said carry-over wheels being rotatable through equal angular distances, detent means to prevent movement of said carriage and said totalizer, and means controlled by said carry-over wheels for rendering said detent means effective when one of said carry-over wheels is in a fraction of an angular position.

78. In a combined typewriting and computing machine, the combination with a totalizer comprising computing wheels, of carry-over wheels rotatable through angular positions, there being a relative traveling movement between said computing wheels and said carry-over wheels, means for preventing said relative traveling movement when one of the carry-over wheels is in a fraction of an angular position, said means comprising a series of levers, one for each carry-over wheel, a universal bar actuated by said levers, a locking device, and an operative connection between said universal bar and said locking device.

79. In a combined typewriting and computing machine, the combination with a totalizer comprising a set of computing wheels, of a master wheel, a set of carry-over wheels, there being a relative traveling movement between one set of wheels and the other set of wheels including the master wheel, said master wheel and the computing wheels being rotatable through angular positions, and means for preventing said relative traveling movement when one of the carry-over wheels is in a fraction of an angular position, or the master wheel is out of alinement with said carry-over wheels.

80. In a combined typewriting and computing machine, the combination with a totalizer comprising a set of computing wheels, of a master wheel, a set of carry-over wheels, there being a relative traveling movement between one set of wheels and the other set of wheels including the master wheel, said master wheel and the computing wheels being rotatable through angular positions, and means for preventing said relative traveling movement when one of the carry-over wheels is in a fraction of an angular position, or said master wheel is out of alinement with said carry-over wheels, said means comprising a series of elements, one for each carry-over wheel and one for the master wheel, said elements coöperating with a universal bar, and a locking device under the control of said universal bar for preventing said relative traveling movement.

81. In a computing machine, the combination with a traveling carriage and a totalizer connected thereto to travel therewith, said totalizer comprising computing wheels fixed against axial movement relative to each other, carry-over wheels for said computing wheels, a master wheel fixed against traveling movement, a set of pivoted levers, one for each carry-over wheel and one for the master wheel, a universal bar engaging with said levers, a locking device to prevent movement of said carriage and said totalizer, and an operative connection between said universal bar and said locking device to render the latter effective when one of the carry-over wheels is in a fraction of an angular position, or the master wheel is out of alinement with said carry-over wheels.

82. In a computing machine, the combination with a totalizer comprising computing wheels, of a master wheel, means to produce a relative traveling movement between said computing wheels and said master wheel to cause said master wheel to be brought into mesh with said computing wheels *seriatim*, means to drive said master wheel in accordance with the digits to be computed, comprising a gear for transmitting movement to succeeding gears having teeth spaced apart at their bases, notches between said teeth, a detent to engage in said notches, and means to withdraw said detent from said transmitting gear to enable actuation thereof and to move said detent into effective position at the end of an operative movement of said transmitting gear.

83. In a computing machine, the combination with a traveling totalizer comprising computing wheels, of a master wheel with which said computing wheels are brought into mesh *seriatim*, and means for locking said totalizer against traveling movement whenever any of said computing wheels in the computing zone, after passing said master wheel, is in displaced position as to rotation about its axis.

84. The combination with computing wheels, of a master wheel for driving said computing wheels *seriatim*, carry-over wheels for said computing wheels, and means for alining said carry-over wheels at the end of an operative movement of said master wheel, including a series of detents individual to said carry-over wheels and normally in engagement therewith, and a device adapted to move said detents *seriatim* into normal engaging position, including a member universal to said detents and through which such movement of the detents may be effected by engagement of said member with said detents.

85. In a combined typewriting and computing machine, the combination with a totalizer, comprising number-bearing wheels, of a train of mechanism for turning said number-bearing wheels through one or more digit distances, said train of mechainsm comprising a series of carry-over devices as one element, and a master wheel as another element, there being a relative traveling movement between the number-bearing wheels and the two elements, and means for preventing said traveling movement when any member of the two elements remains turned a fractional digit distance.

86. In a combined typewriting and computing machine, the combination with a totalizer comprising dial wheels and computing wheels, of a master wheel, said computing wheels and master wheel being rotatable through one or more digit distances, there being a relative traveling movement between said master wheel and computing wheels, and means for preventing said traveling movement when the master wheel or any one of the computing wheels remains turned a fractional digit space.

87. In a combined typewriting and computing machine, the combination with a traveling totalizer comprising dial wheels and computing wheels, of a master wheel rotatable through one or more digit distances to rotate said dial wheels, carry-over wheels fixed relatively to the master wheel for carrying-over on the computing wheels, and means universal to said master wheel and carry-over wheels for preventing the traveling movement of said totalizer when said master wheel remains turned a fractional digit space.

88. In a combined typewriting and computing machine, the combination with a carriage and a totalizer comprising dial wheels and computing wheels, of a master wheel rotatable through digit distances, there being a relative traveling movement controlled by the typewriter carriage between said master wheel and computing wheels, carry-over wheels fixed relatively to the master wheel, a pivoted detent engaging with the master wheel, a separate pivoted detent for each carry-over wheel, a carriage lock, a bail universal to said detents, and a connection from said bail to said carriage lock adapted to hold the carriage locked when any detent is unseated.

89. In a combined typewriting and computing machine, the combination with a totalizer comprising number-bearing elements and computing elements, of a driving element for said computing elements, carry-over elements associated with said computing elements, there being a relative traveling movement between said totalizer and said carry-over elements, and means for preventing said traveling movement when one of said elements is out of a digit position.

90. In a combined typewriting and computing machine, the combination with a totalizer comprising dial wheels and computing wheels, of a master wheel for said computing wheels, carry-over wheels for said computing wheels, said computing wheels and carry-over wheels being rotatable through angular distances by said master wheel, there being a relative traveling movement between said computing wheels and said carry-over wheels, and means for preventing said traveling movement when one of said wheels is in a fraction of an angular position.

91. In a combined typewriter and computing machine, the combination with a carriage and a totalizer comprising dial wheels and computing wheels, of a master wheel, carry-over wheels rotatable through angular positions, alining pawls for said carry-over wheels, there being a relative traveling movement controlled by the typewriter carriage between said computing wheels and said carry-over wheels, and means for preventing said relative movement when one of the carry-over wheels is in a fraction of an angular position.

92. In a combined typewriting and computing machine, the combination with a carriage, of means urging said carriage in a letter-feed direction, a carriage-escapement mechanism including a loose dog subject to the tension exerted by said urging means, numeral keys for actuating said escapement mechanism and releasing said loose dog from said tension, and means effective to disable said keys when said loose dog is released from the said tension.

93. In a combined typewriting and computing machine, the combination with a carriage, of means urging said carriage in a letter-feed direction, a carriage-escapement mechanism including a loose dog subject to the tension exerted by said urging means, numeral keys for actuating said escapement mechanism and releasing said loose dog from said tension, and loose-dog-controlled means effective upon return movement of said carriage to disable said keys.

HENRY L. PITMAN.

Witnesses:
EDITH B. LIBBEY,
ARTHUR A. JOHNSON.